United States Patent
Ren et al.

(10) Patent No.: US 11,682,428 B2
(45) Date of Patent: Jun. 20, 2023

(54) HARD DISK FORMAT CONVERSION METHOD AND APPARATUS, AND STORAGE DEVICE

(71) Applicant: XFUSION DIGITAL TECHNOLOGIES CO., LTD., Zhengzhou (CN)

(72) Inventors: Kunsheng Ren, Shenzhen (CN); Jianhua Zhou, Chengdu (CN)

(73) Assignee: XFUSION DIGITAL TECHNOLOGIES, CO., LTD., Zhengzhou (CN)

( * ) Notice: Subject to any disclaimer, the term of this patent is extended or adjusted under 35 U.S.C. 154(b) by 11 days.

(21) Appl. No.: 17/484,161

(22) Filed: Sep. 24, 2021

(65) Prior Publication Data

US 2022/0013145 A1 Jan. 13, 2022

Related U.S. Application Data

(63) Continuation of application No. PCT/CN2020/007515, filed on Feb. 14, 2020.

(30) Foreign Application Priority Data

May 22, 2019 (CN) .......................... 201910427925.7

(51) Int. Cl.
*G11B 20/12* (2006.01)
*G06F 3/06* (2006.01)

(52) U.S. Cl.
CPC ........ *G11B 20/1217* (2013.01); *G06F 3/0613* (2013.01); *G06F 3/0634* (2013.01); *G06F 3/0676* (2013.01)

(58) Field of Classification Search
None
See application file for complete search history.

(56) References Cited

U.S. PATENT DOCUMENTS 10,120,582 B1* 11/2018 Farhan .................... G06F 11/34
10,474,579 B2* 11/2019 Li ....................... G06F 12/0866
(Continued)

FOREIGN PATENT DOCUMENTS

| CN | 102280112 A | 12/2011 |
|---|---|---|
| CN | 102779528 A | 11/2012 |

(Continued)

OTHER PUBLICATIONS

Xing Zhongzhu, "The principle and application technical specification of a new generation of eight-bit microcontroller (Intel8XC251SB)", Tianjin University Press, Nov. 1996, with an English abstract, total 9 pages.

(Continued)

*Primary Examiner* — Peter Vincent Agustin

(57) ABSTRACT

This application provides a hard disk format conversion method and apparatus, and a storage device, and belongs to the field of storage technologies. In this application, a storage format of a storage unit is converted from an SMR format to a PMR format. Because IOPS in the PMR format is higher than IOPS in the SMR format, IOPS in the storage unit can be increased after the storage format is converted. Alternatively, a storage format of a storage unit is converted from the PMR format to the SMR format. Because a storage capacity in the SMR format is higher than a storage capacity in the PMR format, a storage capacity of the storage unit can be increased after the storage format is converted.

20 Claims, 9 Drawing Sheets

(56) References Cited

U.S. PATENT DOCUMENTS

| | | | |
|---|---|---|---|
| 10,754,574 B1* | 8/2020 | Jo | G06F 3/0613 |
| 10,936,498 B2* | 3/2021 | Ehrlich | G06F 3/061 |
| 2013/0342929 A1 | 12/2013 | Coker et al. | |
| 2016/0232168 A1 | 8/2016 | Lemoal | |
| 2016/0321174 A1* | 11/2016 | Li | G06F 12/0866 |
| 2018/0174613 A1* | 6/2018 | Zhu | G11B 5/5578 |
| 2019/0013046 A1* | 1/2019 | Kulkarni | G06F 11/22 |
| 2019/0244638 A1* | 8/2019 | Boyle | G11B 5/09 |
| 2019/0278711 A1* | 9/2019 | Schmidt | G06F 12/0871 |
| 2022/0013145 A1* | 1/2022 | Ren | G06F 3/0613 |

FOREIGN PATENT DOCUMENTS

| | | | |
|---|---|---|---|
| CN | 102890621 A | | 1/2013 |
| CN | 103345925 A | | 10/2013 |
| CN | 103839555 A | | 6/2014 |
| CN | 104834675 A | | 8/2015 |
| CN | 106155579 A | | 11/2016 |
| CN | 106548789 A | | 3/2017 |
| CN | 106874213 A | | 6/2017 |
| CN | 106899660 A | | 6/2017 |
| CN | 107229664 A | | 10/2017 |
| CN | 107728952 A | | 2/2018 |
| CN | 108376053 A | | 8/2018 |
| CN | 108563730 A | | 9/2018 |
| CN | 105378716 B | | 3/2019 |
| CN | 109697023 A | | 4/2019 |
| CN | 110275677 A | | 9/2019 |

OTHER PUBLICATIONS

International Search Report and Written Opinion issued in PCT/CN2020/075158, dated May 11, 2020, 10 pages.
Office Action issued in CN201910427925.7, dated Feb. 6, 2020, 7 pages.
Office Action issued in CN201910427925.7, dated Sep. 18, 2020, 6 pages.
Office Action issued in CN201910427925.7, dated Mar. 2, 2021, 6 pages.
Office Action issued in CN201910427925.7, dated May 17, 2021, 6 pages.
Chinese Notice of Allowance for Application No. 201910427925.7 dated Jan. 21, 2022, 4 pages.

* cited by examiner

HARD DISK FORMAT CONVERSION METHOD AND APPARATUS, AND STORAGE DEVICE

CROSS-REFERENCE TO RELATED APPLICATIONS

This application is a continuation of International Application No. PCT/CN2020/075158, filed on Feb. 14, 2020, which claims priority to Chinese Patent Application No. 201910427925.7, filed on May 22, 2019, both of which are hereby incorporated by reference in their entireties.

TECHNICAL FIELD

This application relates to the field of storage technologies, and in particular, to a hard disk format conversion method and apparatus, and a storage device.

BACKGROUND

A hard disk drive (English full name: hard disk drive, HDD for short) is a widely used storage medium, and plays an important role in storage technologies thanks to its low costs per unit capacity. A body of a hard disk drive usually includes a plurality of disk platters. An upper surface or a lower surface of each disk platter is referred to as a magnetic surface. The magnetic surface may be divided into a plurality of tracks. One or more tracks may form one storage unit of the hard disk drive, and data that needs to be stored may be stored in the storage unit.

Hard disk drives include two types of drives: a shingled magnetic recording (English full name: shingled magnetic recording, SMR for short) drive and a conventional perpendicular magnetic recording (English full name: perpendicular magnetic recording, PMR for short) drive. Tracks of an SMR drive are similar to overlapping tiles, and an overlapping zone exists between adjacent tracks. Therefore, more tracks can be accommodated on a platter surface of the SMR drive, so that the SMR drive has an advantage of a higher storage capacity. However, when data is written to any track of the SMR drive, a neighboring track of the track is affected. Therefore, for an SMR zone including the tracks of the SMR drive, data can be stored in the SMR zone only in a sequential write manner, but cannot be stored in a random write manner, leading to relatively low input/output operations per second (English full name: input output per second, IOPS for short) of such a storage unit as the SMR zone. In addition, tracks of a PMR drive are separated from each other, and there is a specific spacing between adjacent tracks. Therefore, for a PMR zone including the tracks of the PMR drive, data can be stored in the PMR zone in a random write manner, so that the PMR drive has an advantage of higher IOPS. However, because a relatively small quantity of tracks can be accommodated on a platter surface of the PMR drive, a storage capacity of such a storage unit as the PMR zone is relatively small.

SUMMARY

Embodiments of this application provide a zone format conversion method and apparatus, and a storage device, to resolve a technical problem in a related technology that IOPS of a storage unit is relatively low or a storage capacity of a storage unit is relatively small. Technical solutions are as follows.

According to a first aspect, a zone format conversion method is provided. The method is applied to a storage device, and the method includes:
  selecting a first storage unit, where the first storage unit stores data in a first storage format; and
  instructing the first storage unit to convert the first storage format into a second storage format to obtain a second storage unit, where
  each of the first storage format and the second storage format is one of a shingled magnetic recording SMR format or a perpendicular magnetic recording PMR format, and the first storage format is different from the second storage format.

According to the method provided in this embodiment, a storage format of a storage unit is converted from the SMR format to the PMR format. Because IOPS in the PMR format is higher than IOPS in the SMR format, the IOPS of the storage unit can be increased after the storage format is converted. Alternatively, a storage format of a storage unit is converted from the PMR format to the SMR format. Because a storage capacity in the SMR format is higher than a storage capacity in the PMR format, a storage capacity of the storage unit can be increased after the storage format is converted.

In a possible implementation, the first storage unit is an SMR zone, and the second storage unit is a PMR zone; or the first storage unit is a PMR zone, and the second storage unit is an SMR zone.

In a possible implementation, the first storage unit is an SMR drive, and the second storage unit is a PMR drive; or the first storage unit is a PMR drive, and the second storage unit is an SMR drive.

In a possible implementation, before the selecting a first storage unit, the method further includes:
  determining whether the storage device meets a preset condition.

The preset condition is set, and a hard disk format conversion is performed when the storage device meets the preset condition, so that a hard disk format conversion opportunity can be more flexible, and a hard disk format conversion function can be combined with a current situation.

In a possible implementation, the preset condition includes any one of and a combination of the following conditions:
  whether free space of the storage device is lower than a specified space threshold;
  whether a quantity of first storage units is higher than a specified first quantity threshold;
  whether a quantity of second storage units is lower than a specified second quantity threshold;
  whether cold data stored in the storage device reaches a specified first proportion threshold, where the cold data is data whose access frequency is lower than a temperature threshold;
  whether hot data stored in the storage device reaches a specified second proportion threshold, where the hot data is data whose access frequency is higher than the temperature threshold; or
  whether input/output operations per second IOPS of the storage device is lower than a specified input/output operation threshold.

In a scenario in which there is insufficient free space on the storage device, it may be determined whether the free space of the storage device is lower than the specified space threshold. If the free space of the storage device is lower than the specified space threshold, a disk format conversion is performed, for example, a storage format of a storage unit is converted from the PMR format to the SMR format. Because a storage capacity in the PMR format is higher than a storage capacity in the SMR format, a storage capacity can be increased, thereby increasing free space of the storage device, and resolving insufficiency of free space.

In a scenario in which there are sufficient first storage units, it may be determined whether the quantity of first storage units is higher than the specified first quantity threshold. If the quantity of first storage units is higher than the specified first quantity threshold, the first storage unit is converted into more second storage units to meet a storage capacity requirement or a performance requirement.

In a scenario in which there are insufficient second storage units, it may be determined whether the quantity of second storage units is lower than a specified second quantity threshold, and the first storage unit is converted into more second storage units, so that the storage device includes more second storage units, to meet a storage capacity requirement or a performance requirement.

In a scenario in which temperature of the stored data decreases, it may be determined whether the hot data in the storage device reaches the specified second proportion threshold. If the hot data reaches the specified second proportion threshold, the storage format of the storage unit is converted from the PMR format to the SMR format. In this way, when a proportion of the cold data stored in the storage device is relatively large, an IOPS requirement for the storage device is relatively low. Therefore, even if the storage unit in the PMR format is converted into a storage unit in the SMR format, performance of the storage device is not greatly affected because of a decrease of storage units in the PMR format. In addition, because a storage capacity in the SMR format is higher than that in the PMR format, a storage capacity of the storage device can be increased.

In a scenario in which the temperature of the stored data increases, it may be determined whether the cold data in the storage device reaches the specified first proportion threshold. If the cold data in the storage device reaches the specified first proportion threshold, the storage format of the storage unit is converted from the SMR format to the PMR format, to obtain more PMR zones. In this case, because a proportion of the hot data stored in the storage device is relatively large, the IOPS requirement for the storage device is relatively high. In addition, because the IOPS in the PMR format is higher than the IOPS in the SMR format, the IOPS of the storage device can be increased, thereby improving performance of the storage device.

In a scenario in which the IOPS does not meet a requirement, it is determined whether the IOPS of the storage device is lower than a specified input/output operation threshold. If the IOPS is lower than the specified input/output operation threshold, the storage format of the storage unit is converted from the SMR format to the PMR format. In this case, because the IOPS in the PMR format is higher than the IOPS in the SMR format, the IOPS of the storage device can be increased, thereby improving performance of the storage device.

In a possible implementation, the whether the cold data stored in the storage device reaches a specified first proportion threshold includes: whether the cold data stored in the storage device reaches the specified first proportion threshold, and whether an increase that is of cold data stored in the storage device and that is in a target time period reaches a specified first increase threshold.

In this manner, if the cold data stored in the storage device has reached the specified first proportion threshold, and the increase within preset duration has reached the specified first increase threshold, it indicates that the data in the storage device is relatively cold, and the temperature of the data tends to become colder. If colder data needs to be stored, the storage format of the storage unit may be converted from the PMR format to the SMR format. In this way, when a proportion of the cold data stored in the storage device is relatively large, the IOPS requirement for the storage device is relatively low. Therefore, even if the storage unit in the PMR format is converted into a storage unit in the SMR format, performance of the storage device is not greatly affected because of a decrease of storage units in the PMR format. In addition, because the storage capacity in the SMR format is higher than that in the PMR format, a storage capacity of the storage device can be increased.

In a possible implementation, the whether hot data stored in the storage device reaches a specified second proportion threshold includes: whether the hot data stored in the storage device reaches the specified second proportion threshold; and whether an increase that is of hot data stored in the storage device and that is in the target time period reaches a specified second increase threshold.

In this manner, if the hot data stored in the storage device has reached the specified second proportion threshold, and the increase within the preset duration has reached the specified second increase threshold, it indicates that the data in the storage device is relatively hot, and the data tends to become hotter. Therefore, higher IOPS is required. In this case, the storage format of the storage unit may be converted from the SMR format to the PMR format to increase IOPS.

In a possible implementation, the first storage unit is preconfigured with a first parameter and a second parameter, the first parameter is used to support the first storage format, and the second parameter is used to support the second storage format; and the instructing the first storage unit to convert the first storage format into a second storage format specifically includes:

instructing the first storage unit to enable the second parameter and disable the first parameter.

In a possible implementation, the first parameter includes any one of and a combination of a flying height, bits per inch BPI, tracks per inch TPI, a distance between a reader and a writer in a tangent line, and a distance between the reader and the writer in a radial direction.

In a possible implementation, before the instructing the first storage unit to convert the first storage format into a second storage format, the method further includes:

migrating, to another storage unit of the storage device, the data stored in the first storage unit.

Before the storage format of the first storage unit is converted, the data stored in a first storage zone is migrated to another zone in advance, to avoid a loss of the data stored in the first storage zone, implement a function of backing up the data stored in the first storage zone, and improve data storage security.

In a possible implementation, after the instructing the first storage unit to convert the first storage format into a second storage format, to obtain a second storage unit, the method further includes:

migrating, to the second storage unit, the data stored in the another storage unit of the storage device.

In a possible implementation, the migrating, to the second storage unit, the data stored in the another storage unit of the storage device includes:

if data is stored in the second zone in the SMR format, migrating, to the second storage unit, cold data stored in the another storage unit of the storage device; or if data is stored in the second zone in the PMR format, migrating, to the second storage unit, hot data stored in the another storage unit of the storage device.

In this manner, characteristics of a higher storage capacity in the SMR format and higher IOPS in the PMR format can be fully utilized, and distribution of cold data and hot data in the storage device can be adjusted, so that storage resources of the storage device are properly planned, and overall performance of the storage device is more optimized.

According to a second aspect, a zone format conversion apparatus is provided. The apparatus is applied to a storage device, and the apparatus includes:
 a selection module, configured to select a first storage unit, where the first storage unit stores data in a first storage format; and
 an instruction module, configured to instruct the first storage unit to convert the first storage format into a second storage format, to obtain a second storage unit.

Each of the first storage format and the second storage format is one of a shingled magnetic recording SMR format or a perpendicular magnetic recording PMR format, and the first storage format is different from the second storage format.

In a possible implementation, the apparatus further includes:
 a determining module, configured to determine whether the storage device meets a preset condition.

In a possible implementation, the preset condition includes any one of and a combination of the following conditions:
 whether free space of the storage device is lower than a specified space threshold;
 whether a quantity of first storage units is higher than a specified first quantity threshold;
 whether a quantity of second storage units is lower than a specified second quantity threshold;
 whether cold data stored in the storage device reaches a specified first proportion threshold, where the cold data is data whose access frequency is lower than a temperature threshold;
 whether hot data stored in the storage device reaches a specified second proportion threshold, where the hot data is data whose access frequency is higher than the temperature threshold; or
 whether input/output operations per second IOPS of the storage device is lower than a specified input/output operation threshold.

In a possible implementation, the first storage unit is preconfigured with a first parameter and a second parameter, the first parameter is used to support the first storage format, and the second parameter is used to support the second storage format; and
 the instruction module is specifically configured to instruct the first storage unit to enable the second parameter and disable the first parameter.

In a possible implementation, the first parameter includes any one of and a combination of a flying height, bits per inch BPI, tracks per inch TPI, a distance between a reader and a writer in a tangent line, and a distance between the reader and the writer in a radial direction.

In a possible implementation, the apparatus further includes:
 a migration module, configured to migrate, to another storage unit of the storage device, the data stored in the first storage unit.

According to a third aspect, a storage device is provided. The storage device includes a processor and at least two zones, and the at least two zones include a shingled magnetic recording SMR zone and a perpendicular magnetic recording PMR zone;
 the processor is configured to select a first zone, where data is stored in the first zone in a first storage format; and
 the processor is configured to instruct the first zone to convert the first storage format into a second storage format to obtain a second zone, where each of the first storage format and the second storage format is one of an SMR format or a PMR format, and the first storage format is different from the second storage format.

In a possible implementation, the processor is further configured to determine whether the storage device meets a preset condition.

In a possible implementation, the preset condition includes any one of and a combination of the following conditions:
 whether free space of the storage device is lower than a specified space threshold;
 whether a quantity of first zones is higher than a specified first quantity threshold;
 whether a quantity of second zones is lower than a specified second quantity threshold;
 whether cold data stored in the storage device reaches a specified first proportion threshold, where the cold data is data whose access frequency is lower than a temperature threshold;
 whether hot data stored in the storage device reaches a specified second proportion threshold, where the hot data is data whose access frequency is higher than the temperature threshold; or
 whether input/output operations per second IOPS of the storage device is lower than a specified input/output operation threshold.

In a possible implementation, the first zone is preconfigured with a first parameter and a second parameter, the first parameter is used to support the first storage format, and the second parameter is used to support the second storage format; and
 the processor is specifically configured to instruct the first zone to enable the second parameter and disable the first parameter.

In a possible implementation, the first parameter includes any one of and a combination of a flying height, bits per inch BPI, tracks per inch TPI, a distance between a reader and a writer in a tangent line, and a distance between the reader and the writer in a radial direction.

In a possible implementation, the processor is further configured to migrate, to another zone of the storage device, the data stored in the first zone.

According to a fourth aspect, a storage device is provided. The storage device includes a system controller and at least two disks, and the at least two disks include a shingled magnetic recording SMR drive and a perpendicular magnetic recording PMR drive;
 the system controller is configured to select a first disk, where the first disk stores data in a first storage format; and
 the system controller is configured to instruct the first disk to convert the first storage format into a second storage format to obtain a second disk, where each of the first storage format and the second storage format is one of an SMR format or a PMR format, and the first storage format is different from the second storage format.

In a possible implementation, the system controller is further configured to determine whether the storage device meets a preset condition.

In a possible implementation, the preset condition includes any one of and a combination of the following conditions:
whether free space of the storage device is lower than a specified space threshold;
whether a quantity of first disks is higher than a specified first quantity threshold;
whether a quantity of second disks is lower than a specified second quantity threshold;
whether cold data stored in the storage device reaches a specified first proportion threshold, where the cold data is data whose access frequency is lower than a temperature threshold;
whether hot data stored in the storage device reaches a specified second proportion threshold, where the hot data is data whose access frequency is higher than the temperature threshold; or
whether input/output operations per second IOPS of the storage device is lower than a specified input/output operation threshold.

In a possible implementation, the first disk is preconfigured with a first parameter and a second parameter, the first parameter is used to support the first storage format, and the second parameter is used to support the second storage format; and
the system controller is specifically configured to instruct the first disk to enable the second parameter and disable the first parameter.

In a possible implementation, the first parameter includes any one of and a combination of a flying height, bits per inch BPI, tracks per inch TPI, a distance between a reader and a writer in a tangent line, and a distance between the reader and the writer in a radial direction.

In a possible implementation, the system controller is further configured to migrate, to another disk of the storage device, the data stored in the first disk.

According to a fifth aspect, a computer program is provided. The computer program includes instructions used to perform the first aspect or any possible implementation of the first aspect.

According to a sixth aspect, a computer-readable storage medium is provided. The computer-readable storage medium is configured to store the computer program described in the fifth aspect.

DESCRIPTION OF EMBODIMENTS

To make the objectives, technical solutions, and advantages of this application clearer, the following further describes the implementations of this application in detail with reference to the accompanying drawings.

In this application, terms such as "first", "second", and the like are used to distinguish between same items or similar items whose functions and functions are basically the same. It should be understood that there is no logical or sequential dependency between "first", "second", and "$n^{th}$". A quantity and an execution sequence are not limited.

The following describes concepts used in this application.

Figure 1:
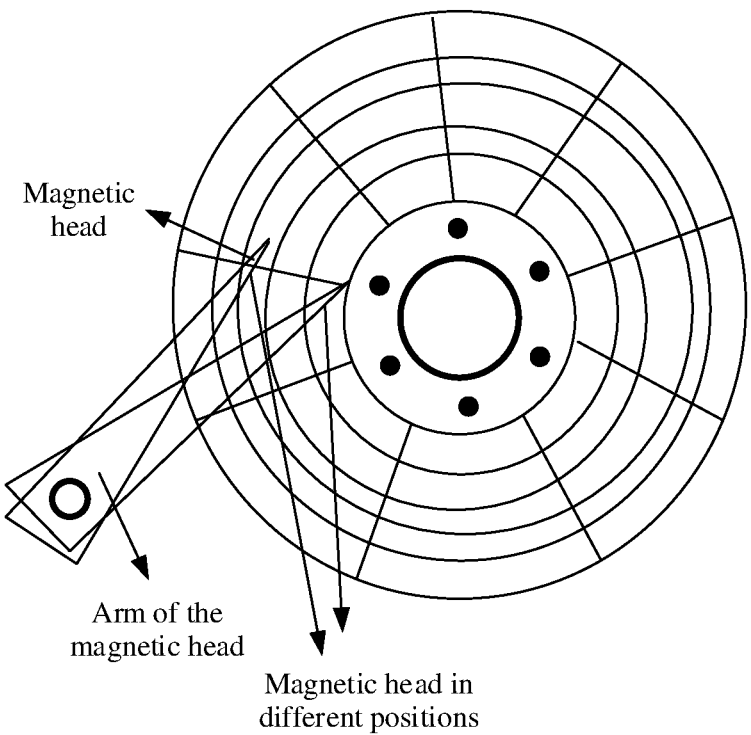
FIG. 1 is a schematic diagram of a data read/write principle of an HDD according to an embodiment of this application.

An HDD is a storage medium that features a low price per unit capacity. The HDD generally includes one or more disk platters. An upper surface or a lower surface of each disk platter may generally store data, is an effective platter surface, and is generally referred to as a magnetic surface. Each magnetic surface may be logically divided into a plurality of tracks. Generally, the magnetic surface may be divided into thousands or even tens thousands of tracks. Each track is a concentric circle, an outermost concentric circle on a magnetic surface may be denoted as a track 0, and one or more tracks may form a storage unit of the hard disk drive. There may be one magnetic head above each magnetic sheet and one magnetic head below the magnetic sheet, and the magnetic sheet may spin between the two magnetic heads. When an HDD reads or writes data, referring to FIG. 1, a magnetic head finds, on the magnetic sheet, a track corresponding to a storage location of the data, and finds a corresponding sector on the track. Then, when a distance between a magnetic head and a magnetic disk meets a requirement, a variable current is applied to the magnetic head, so that a magnetic field on the track changes accordingly, and a changed magnetic field on the track is stored data. The magnetic head includes a reader and a writer. The reader is configured to perform positioning when a read operation or a write operation is performed. The writer is configured to write data. A width of the writer may be approximately twice that of the reader.

A parameter is also referred to as a zone format (English full name: zone format, ZF for short), and is used to support a storage format of a storage unit in a hard disk. If a parameter is enabled for a storage unit in a magnetic disk, data may be stored in the storage unit by using the parameter, and a storage format of the storage unit is a storage format corresponding to the parameter. In some possible embodiments, the parameter may include any one of and a combination of a flying height, bits per inch (English full name: bits per inch, BPI for short), tracks per inch (English full name: track per inch, TPI for short), a distance between a reader and a writer in a tangent line, and a distance between the reader and the writer in a radial direction.

Flying height: When a magnetic disc spins, airflow is generated. The airflow lifts a magnetic head and make the magnetic head float. A floating height of the magnetic head is referred to as a flying height. The flying height is a distance between the magnetic head and a magnetic disk. During HDD reading and writing, the flying height needs to be within a specific range to ensure that a writer can write a signal to a track by using an appropriate circuit and that a reader can sense a signal from the track.

Figures 2A, 2B:
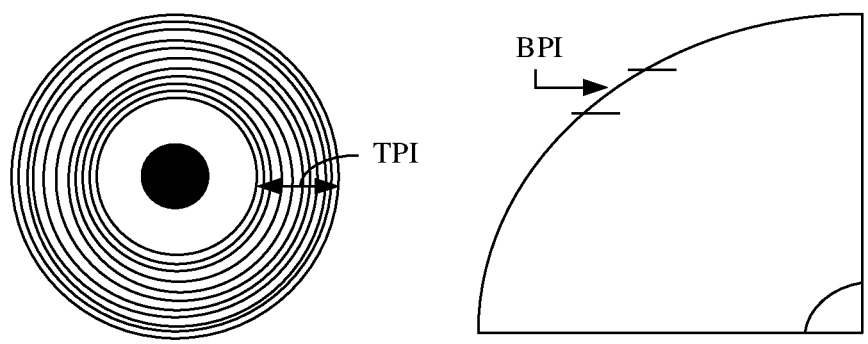
FIG. 2($a$) and FIG. 2($b$) are schematic diagrams of TPI and BPI according to an embodiment of this application.

TPI refers to a quantity of tracks that can be stored per inch on a disk, and the TPI may be shown in FIG. 2(a).

BPI refers to a quantity of bits (bit) that can be stored per inch on a track. The BPI may be shown in FIG. 2(b). The BPI can reflect a storage density on the track.

A disk capacity is determined by a product of BPI and TPI. By analogy, it is assumed that a platter surface is considered as a road, a track is considered as a lane on a road, a quantity of cars on a single lane of the road can be understood as the BPI, and a total quantity of lanes on the road can be understood as the TPI. In this case, a total quantity of cars on the road can be understood as a disk capacity, and the total quantity of cars is equal to a product of the quantity of cars on the single lane and the quantity of lanes.

A distance between a reader and a writer in a tangent line is used to determine a location of the reader and the writer in the tangent direction of a track.

A distance between a reader and a writer in a radial direction is used to determine a location of the reader and the writer in the radial direction of a track.

A PMR drive is a drive with a spacing between adjacent tracks. Tracks of the PMR drive are separated from each other. For example, referring to FIG. 3(a), there is a specific spacing between a track (N−1) and a track N, and there is a specific spacing between the track N and a track (N+1), where N is a positive integer. Each track of the PMR drive may be divided into at least two PMR zones, and each PMR zone includes one or more tracks. Compared with an SMR drive, a PMR drive has an advantage of higher IOPS. Specifically, because different tracks do not overlap, when data is written to any track, other tracks are not affected. Therefore, data may be stored on the PMR drive through random write. In this case, because the random write brings higher IOPS, the IOPS of the PMR drive is higher than IOPS of the SMR drive. However, for the PMR drive, a magnetic head needs to have a specific width to write a signal to the tracks. Generally, a wider magnetic head indicates a wider track and less TPI. In this case, a quantity of tracks that can be accommodated on a platter surface of the PMR drive is relatively small. Consequently, a storage capacity of the PMR drive is limited. As a result, a storage capacity of the PMR drive is generally less than a storage capacity of the SMR drive.

Figures 3A, 3B:
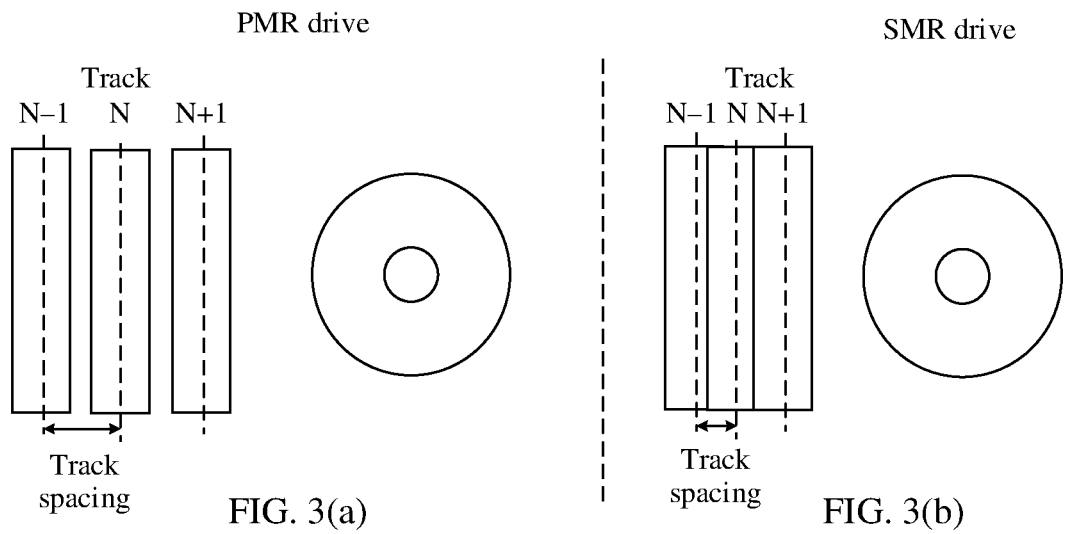
FIG. 3($a$) and FIG. 3($b$) are schematic diagrams of tracks of a PMR drive and tracks of an SMR drive according to an embodiment of this application.

SMR drive: Tracks of the SMR drive are similar to overlapping shingles, and there is an overlapping zone between adjacent tracks. For example, referring to FIG. 3(b), a track (N−1) and a track N overlap, and a track N and a track (N+1) overlaps. An SMR drive divides a plurality of tracks into several bands (Band). The band is a continuously writable zone including consecutive tracks, and each zone forms a basic unit that needs sequential writing. A band is a physical concept on the SMR drive, and a logical concept corresponding to the band is an SMR zone (zone). The SMR zone is a sequential write zone, on the SMR drive, that can be viewed by upper-layer software. A size of an SMR zone is usually 256 megabytes (English full name: MByte, MB for short). Compared with a PMR drive, an SMR drive has an advantage of a higher capacity. Specifically, based on characteristics that widths of a reader and a writer are different and a magnetic field required for reading data is weaker than a magnetic field required for writing data, the SMR drive changes a recording format in which discrete tracks are independent of each other to a recording format in which the discrete tracks overlap. In this case, a distance between centers of adjacent tracks is significantly reduced without adding additional hardware complexity, so that there may be more tracks per inch. In this way, as shown in FIG. 3(a) and FIG. 3(b), TPI can be significantly increased. Although a reader is relatively narrow, the reader can still read data from the track. Therefore, a product of BPI and TPI can be increased in a case of an unchanged physical size and without increasing the BPI, that is, a storage capacity is increased. Generally, in a case of a same magnetic head and a same magnetic disk, a capacity of an SMR drive is about 20% higher than a capacity of a PMR drive. Therefore, data storage costs of the SMR drive are about 15% lower than costs of the PMR drive. However, although the capacity of the SMR drive increases, the SMR drive has its inherent disadvantages. Because a storage format of the SMR drive is similar to a shingled mode, when data is written to any track of the SMR drive, other tracks that overlap the track are overwritten. Consequently, data stored on the other tracks is affected. Therefore, data cannot be randomly written to any track in an SMR format as in a PMR format. As a result, IOPS of the SMR drive is generally less than IOPS of the PMR drive.

Figure 4:
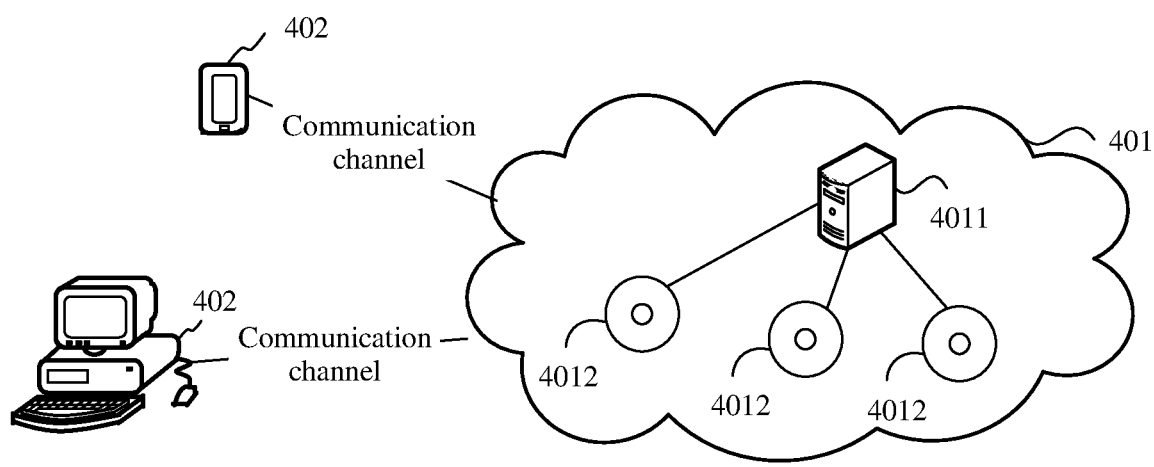
FIG. 4 is an architectural diagram of an implementation environment according to an embodiment of this application.

FIG. 4 is an architectural diagram of an implementation environment according to an embodiment of this application. The implementation environment includes a storage device 401 and a terminal 402. The storage device 401 and the terminal 402 may establish a communication channel, and communicate with each other through the communication channel.

In some possible embodiments, the storage device 401 may include a system controller 4011 and at least two disks 4012. The at least two disks 4012 include an SMR drive and a PMR drive. The system controller 4011 is configured to control the at least two disks 4012 to perform hard disk format conversion, and each disk 4012 may be controlled by the system controller 4011 to convert a storage format of the disk 4012 into another storage format.

In some possible embodiments, the storage device 401 may provide a data storage service for the terminal 402. Specifically, the terminal 402 may send to-be-stored data to the system controller 4011. The system controller 4011 may send the data to the at least two disks 4012. The at least two disks 4012 may receive the data from the system controller 4011 and store the data. For example, the terminal 402 may send an input/output (English full name: input/output, I/O for short) request to the storage device 401. The I/O request carries data that needs to be stored. The storage device 401 may receive the I/O request from the terminal 402, obtain the data from the I/O request, and store the data.

The storage device 401 may be provided to a user as a cloud storage service. Specifically, the storage device 401 may run in a cloud environment, for example, may run on a public cloud, a private cloud, or a hybrid cloud. The user may apply for storage space of a specific capacity in the cloud storage service by using the terminal 402. The storage device 401 may allocate storage space of a corresponding capacity to the user, for example, allocate one or more disks 4012 to the user, to store data in the allocated storage space. As an example, the storage device 401 may be provided as an object storage service (English full name: object storage service, OBS for short), a cloud disk, and a cloud database.

The terminal 402 may be a personal computer (English full name: personal computer, PC for short), a mobile phone, a tablet, or the like. A person skilled in the art may know that there may be more or less terminals 402. For example, there may be only one terminal 402, or there may be dozens, hundreds, or more terminals 402. In this case, the foregoing implementation environment further includes another terminal. A quantity of terminals 402 and device types of the terminals 402 are not limited in this embodiment of this application.

Figure 5:
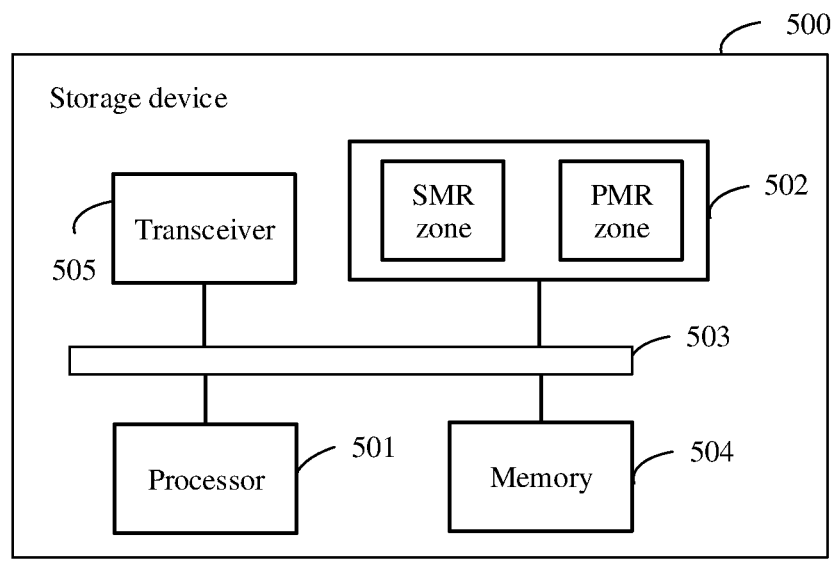
FIG. 5 is a schematic structural diagram of a storage device according to an embodiment of this application.

As shown in FIG. 5, this application provides a storage device 500. The storage device 500 may be but not limited to a disk. For example, the storage device 500 may be an HDD. The storage device 500 includes a processor 501 and at least two zones 502.

The processor 501 may be but not limited to a control circuit or a control chip. In some possible embodiments, the storage device 500 may include a system on chip, and the processor 501 may be located in the system on chip of the storage device 500.

The at least two zones 502 include an SMR zone and a PMR zone. Each zone 502 is a storage unit of the storage device 500, and each zone 502 may be used to store data. The storage device 500 may include one or more disk platters, each disk platter includes an upper surface and a lower surface, and each zone 502 may be located on an upper surface or a lower surface of any disk platter of the storage device 500.

The storage device 500 may further include a memory 504. The memory 504 stores at least one instruction, and the at least one instruction is loaded and executed by the processor 501, to implement the zone format conversion method provided in the following embodiment of FIG. 7. In some possible embodiments, the memory 504 may store a first parameter and a second parameter, the first parameter is used to support a first storage format, and the second parameter is used to support a second storage format. The memory 504 may be a non-volatile memory, for example, a flash memory (flash). The memory 504 may be located in a system on chip of the storage device 500.

In addition, the storage device 500 may further include a bus 503 and a transceiver 505. The bus 503 is connected to both the processor 501 and the at least two zones 502, and the processor 501 and the at least two zones 502 may communicate with each other through the bus 503. The transceiver 505 is configured to send and receive a signal, for example, may be configured to receive an instruction from a system controller 601 or a host shown in the following embodiment in FIG. 6.

Certainly, the storage device 500 may further include another component configured to implement a device function. Details are not described herein again.

Figure 6:
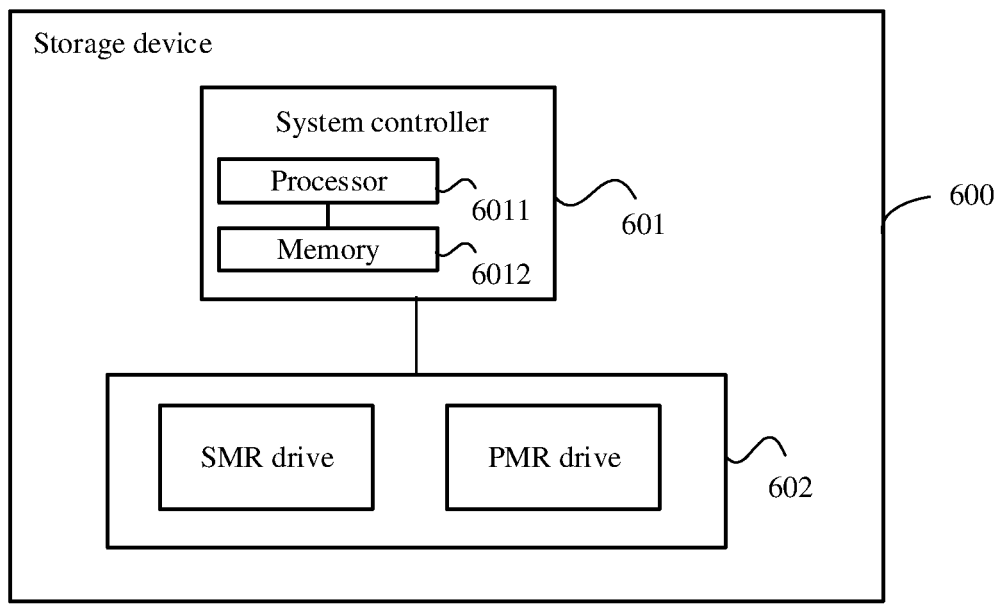
FIG. 6 is a schematic structural diagram of a storage device according to an embodiment of this application.

As shown in FIG. 6, this application provides a storage device 600. The storage device 600 may be but not limited to a storage array. The storage device 600 includes a system controller 601 and at least two disks 602.

The system controller 600 may be a server, a personal computer (English full name: personal computer, PC for short), or the like. The system controller 601 may vary greatly according to different configurations or performance, and may include one or more processors 6011 (central processing units, CPU) and one or more memories 6012. The memory 6012 of the system controller 601 stores at least one instruction, and the at least one instruction is loaded and executed by the processor 6011 to implement the zone format conversion method provided in the following embodiment of FIG. 10. The memory 6012 of the system controller 601 may be, but not limited to, a volatile memory 6012 or a non-volatile memory 6012, for example, a random access memory 6012 (English full name: random access memory, RAM for short), a read-only memory 6012 (English full name: read-only memory, ROM for short), a compact disc read-only memory (English full name: compact disc read-only memory, CD-ROM for short), a magnetic tape, a floppy disk, a metadata storage device, a flash memory 6012, an HDD, or a solid-state drive (English full name: solid state drive, SSD for short). Certainly, the system controller 601 may further have components such as a wired or wireless network interface and an input/output interface, to perform input/output. The system controller 601 may further include another component configured to implement a device function. Details are not described herein again.

It should be noted that FIG. 6 is described only by using an example in which the storage device 600 includes one system controller 601. In some possible embodiments, the storage device 600 may also include two or more system controllers. Steps in the following embodiment of FIG. 10 may be performed on different system controllers, to share an overall calculation amount of the system controller 601. In addition, a mode of a connection between different system controllers 601 is not limited in this embodiment, as long as the different system controllers 601 can communicate with each other. In addition, a mode of a connection between the system controller 601 and the disk 602 is not limited, either, as long as different system controllers 601 can communicate with each other.

Each disk 602 may be the storage device 500 in the embodiment of FIG. 5, and each disk 602 may be, but not limited to, a hard disk, for example, an HDD. Each disk 602 is a storage unit of the storage device 600. The at least two disks 602 may include an SMR drive and a PMR drive.

In this embodiment of this application, the storage device may convert a storage format of the storage unit, to obtain a storage unit in another storage format. For example, the storage device may convert a storage format of the storage unit from an SMR format to a PMR format, or convert a storage format of the storage unit from a PMR format to an SMR format.

An example in which a storage unit is an SMR zone or a PMR zone is used below to describe a zone format conversion procedure by using the embodiment of FIG. 7.

Figure 7:
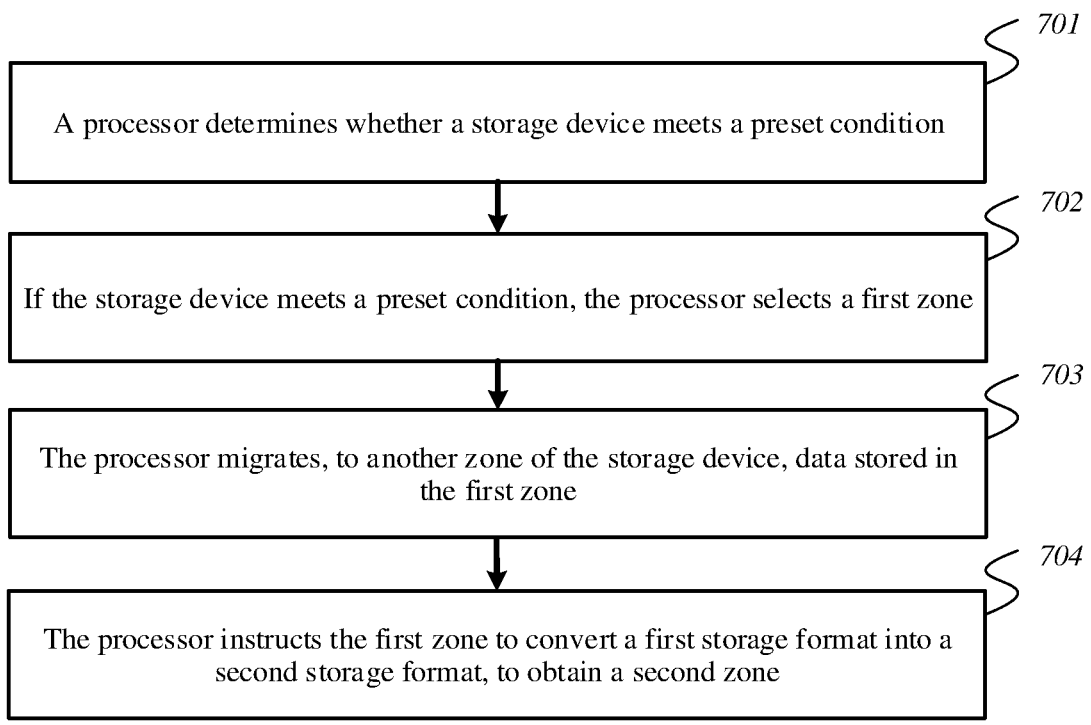
FIG. 7 is a flowchart of a hard disk format conversion method according to an embodiment of this application.

FIG. 7 is a flowchart of a zone format conversion method according to an embodiment of this application. The method may be applied to the storage device shown in FIG. 5. The method may be executed by the processor 501 of the storage device 500. The method includes the following steps 701 to 704.

Step 701: The processor determines whether the storage device meets a preset condition.

In some possible embodiments, the preset condition may include any one of and a combination of the following condition (1) to condition (6):

Condition (1): whether free space of the storage device is lower than a specified space threshold.

If the preset condition includes the condition (1), the processor may obtain the free space of the storage device, and determine whether the free space of the storage device is lower than the specified space threshold. If the free space of the storage device is lower than the specified space threshold, the processor performs the following step 702. The processor may obtain free space of each zone in the storage device, and determine a sum of free space of all the zones as the free space of the storage device.

If step 701 is performed based on the condition (1), in a scenario in which the free space of the storage device is insufficient, the processor may convert a storage format of a zone from a PMR format to an SMR format after determining that the storage device meets the condition (1). In this case, a storage capacity of a single zone in the SMR format is higher than that in the PMR format. Therefore, after storage format conversion is performed based on the condition (1), the storage capacity can be increased, thereby resolving insufficiency of free space.

The space threshold may be set based on an experiment, experience, or a requirement. A specific value of the space threshold is not limited in this embodiment. In some possible embodiments, the space threshold may be prestored in the storage device. For example, the space threshold may be stored in a memory of the storage device, for example, may be stored in a flash memory in a system on chip of the storage device. The processor may read the space threshold from the memory. In some other possible embodiments, a user may enter the space threshold on a terminal, the terminal may obtain the space threshold entered by the user, the terminal may send the space threshold to the storage device, and the storage device may receive the space threshold from the terminal.

Optionally, the space threshold may be dynamically adjusted. Specifically, the terminal may send a space threshold to the storage device for a plurality of times. Each time the storage device receives a space threshold from the terminal, the storage device may update a stored space threshold to the received space threshold. With reference to this manner, the condition (1), and a subsequent step, the storage device may dynamically adjust a size of the free space. For example, a space threshold originally set by the storage device is a. The storage device determines whether the free space is lower than a. When the free space is lower than a, the storage device performs a subsequent step to convert a storage format of a zone from the PMR format to the SMR format until the free space reaches a. In this case, the free space is controlled to a. Then, the terminal sends a space threshold b to the storage device. The storage device updates the space threshold to b, and determines whether the free space is lower than b. When the free space is lower than b, the storage device performs a subsequent step to convert a storage format of a zone on the disk from the PMR format to the SMR format until the free space reaches b. In this case, the free space is controlled to b. In this way, the storage device may dynamically adjust the free space of the disk from a to b, thereby improving flexibility. b and a are positive numbers, and b is different from a.

Condition (2): whether a quantity of first zones is higher than a specified first quantity threshold.

If the preset condition includes the condition (2), the processor may obtain the quantity of first zones in the storage device, and determine whether the quantity of first zones in the storage device is higher than the specified first quantity threshold. If the quantity of first zones is higher than the specified first quantity threshold, the processor performs the following step 702.

By performing step 701 based on the condition (2), in a scenario in which there are sufficient first zones, the processor may convert the first zones into more second zones, to meet a storage capacity requirement or a performance requirement. Specifically, the first zone may be an SMR zone. It is determined whether SMR zones in the storage device are higher than the specified first quantity threshold. If the quantity of SMR zones is higher than the specified first quantity threshold, a subsequent step is performed to convert a storage format of the SMR zone from an SMR format to the PMR format. In this case, because IOPS in the PMR format is higher than IOPS in the SMR format, the IOPS can be increased, thereby improving performance of the storage device. In some other possible embodiments, the first zone may be a PMR zone. It is determined whether PMR zones in the storage device are higher than the specified first quantity threshold. If the quantity of PMR zones is higher than the specified first quantity threshold, a subsequent step is performed to convert a storage format of the PMR zone from the PMR format to the SMR format. In this case, a storage capacity in the SMR format is higher than that in the PMR format, thereby increasing a storage capacity of the storage device.

The first quantity threshold may be set based on an experiment, experience, or a requirement. A specific value of the first quantity threshold is not limited in this embodiment. In some possible embodiments, the first quantity threshold may be prestored in the storage device, for example, stored in a memory of the storage device. The processor of the storage device may read the first quantity threshold from the memory. In some other possible embodiments, the user may enter the first quantity threshold on the terminal, the terminal may obtain the first quantity threshold entered by the user, the terminal may send the first quantity threshold to the storage device, and the storage device may receive the first quantity threshold from the terminal.

Optionally, the first quantity threshold may be dynamically adjusted. Specifically, the terminal may send a first quantity threshold to the storage device for a plurality of times. Each time the storage device receives a first quantity threshold from the terminal, the storage device may update a stored first quantity threshold to the received first quantity threshold. With reference to this manner, the condition (2), and a subsequent step, the storage device may dynamically adjust a quantity of first zones. For example, a first quantity threshold originally set by the storage device is c. The storage device determines whether the quantity of first zones is higher than c; and when the quantity of first zones is higher than c, performs a subsequent step to convert a storage format of a zone on a disk, thereby reducing the quantity of first zones and obtaining more second zones. Then, the terminal sends a first quantity threshold d to the storage device. The storage device updates the first quantity threshold to d, and determines whether the quantity of first zones is higher than d. When the quantity of first zones is higher than d, the storage device performs a subsequent step to obtain more second zones. In this case, if d is less than c, after a storage format of a zone has been converted, the quantity of first zones may be further reduced, to increase the quantity of second zones.

Condition (3): whether a quantity of second zones is lower than a specified second quantity threshold.

If the preset condition includes the condition (3), the processor may obtain the quantity of second zones in the storage device, and determine whether the quantity of second zones in the storage device is lower than the specified second quantity threshold. If the quantity of second zones is lower than the specified second quantity threshold, the processor performs the following step 702.

By performing step 701 based on the condition (3), in a scenario in which there are insufficient second zones, the processor may obtain more second zones through conversion, to meet a storage capacity requirement or a performance requirement. In some possible embodiments, the second zone may be an SMR zone. It is determined whether SMR zones in the storage device are lower than the specified second quantity threshold. If the quantity of SMR zones is lower than the specified second quantity threshold, a subsequent step is performed to convert a storage format of a PMR zone from the PMR format to the SMR format to obtain an SMR zone. In this way, the storage device may include more SMR zones, and it is ensured that the quantity of SMR zones can meet a requirement. In addition, because a storage capacity in the SMR format is higher than that in the PMR format, a storage capacity of the storage device can be increased. In some other possible embodiments, the second zone may be a PMR zone. It is determined whether PMR zones in the storage device are lower than the specified second quantity threshold. If the quantity of PMR zones is lower than the specified second quantity threshold, a subsequent step is performed to convert a storage format of an SMR zone from the SMR format to the PMR format. In this way, the storage device may include more PMR zones, and it is ensured that the quantity of PMR zones can meet a requirement. In addition, because IOPS in the PMR format is higher than IOPS in the SMR format, the IOPS can be increased, thereby improving performance of the storage device.

The second quantity threshold may be the same as or different from the first quantity threshold. A value relationship between the second quantity threshold and the first quantity threshold is not limited in this embodiment. The second quantity threshold may be set based on an experiment, experience, or a requirement. A specific value of the second quantity threshold is not limited in this embodiment. In some possible embodiments, the second quantity threshold may be prestored in the storage device, for example, stored in a memory of the storage device, for example, stored in a flash memory of a system on chip of the storage device. The processor may read the second quantity threshold from the memory. In some other possible embodiments, the user may enter the second quantity threshold on the terminal, the terminal may obtain the second quantity threshold entered by the user, the terminal may send the second quantity threshold to the storage device, and the storage device may receive the second quantity threshold from the terminal.

Optionally, the second quantity threshold may be expressed as a product of a total capacity of the storage device and a proportion threshold, the proportion threshold is a ratio of a total capacity of the second zones to a total capacity of the first zones, the proportion threshold may be expressed in percentages, and the proportion threshold indicates a proportion of the second zones in the storage device. For example, if the proportion threshold is denoted as x, the second quantity threshold may be expressed as a total capacity*x %, where * represents multiplication, and x is a positive number.

Optionally, the second quantity threshold may be dynamically adjusted. Specifically, the terminal may send a second quantity threshold to the storage device for a plurality of times. Each time the storage device receives a second quantity threshold from the terminal, the storage device may update a stored second quantity threshold to the received second quantity threshold. With reference to this manner, the condition (2), and a subsequent step, the storage device may dynamically adjust the quantity of second zones. For example, the second quantity threshold originally set by the storage device is c. The storage device determines whether the quantity of second zones is lower than d. When the quantity of second zones is lower than d, the storage device performs a subsequent step to convert a storage format of a zone on a disk, to obtain more second zones, until the quantity of second zones reaches d. Then, the terminal sends a second quantity threshold e to the storage device. The storage device updates the second quantity threshold to e, and determines whether the quantity of second zones is lower than e. When the quantity of second zones is lower than e, the storage device performs a subsequent step to obtain more second zones, until the quantity of second zones reaches e. In this case, if d is less than e, the quantity of second zones may be adjusted to e based on d, thereby further increasing the quantity of second zones.

Condition (4): whether cold data stored in the storage device reaches a specified first proportion threshold.

If the preset condition includes the condition (4), the processor may determine whether the cold data stored in the storage device reaches the specified first proportion threshold. If the cold data reaches the specified first proportion threshold, the processor performs the following step 702. The cold data is data whose access frequency is lower than a temperature threshold, and the temperature threshold may be prestored in a memory of the storage device. In a possible implementation, the processor may obtain a data volume of cold data stored in each zone and a data volume of all data stored in the zone, obtain a proportion of the data volume of the cold data in the data volume of all the data, use the proportion as a proportion of cold data stored in the storage device, and compare the proportion of the cold data with the specified first proportion threshold, so as to determine whether the cold data reaches the specified first proportion threshold.

In some possible embodiments, if step 701 is performed based on the condition (4), the first zone may be a PMR zone, and the second zone may be an SMR zone. In this case, in a scenario in which temperature of the stored data decreases, it is determined whether the cold data in the storage device reaches the specified first proportion threshold. If the cold data reaches the specified first proportion threshold, a PMR zone is converted into an SMR zone, to obtain more SMR zones. In this way, when a proportion of the cold data stored in the storage device is relatively large, an IOPS requirement for the storage device is relatively low. Therefore, even if the PMR zone of the storage device is converted into the SMR zone, performance of the storage device is not greatly affected because of a decrease in PMR zones. In addition, because a storage capacity in the SMR format is higher than that in the PMR format, a storage capacity of the storage device can be increased.

The first proportion threshold may be set based on an experiment, experience, or a requirement. A specific value of the first proportion threshold is not limited in this embodiment. In some possible embodiments, the first proportion threshold may be prestored in the storage device, for example, stored in a memory of the storage device. The processor may read the first proportion threshold from the memory. In some other possible embodiments, the user may enter the first proportion threshold on the terminal, the terminal may obtain the first proportion threshold entered by the user, the terminal may send the first proportion threshold to the storage device, and the storage device may receive the first proportion threshold from the terminal.

Optionally, the first proportion threshold may be dynamically adjusted. Specifically, the terminal may send a first proportion threshold to the storage device for a plurality of times. Each time the storage device receives a first proportion threshold from the terminal, the storage device may update a stored first proportion threshold to the received first proportion threshold.

In some possible embodiments, the condition (4) may include: whether the cold data stored in the storage device reaches the specified first proportion threshold, and whether an increase that is within a target time period and that is of the cold data stored in the storage device reaches a specified first increase threshold. In this case, the system controller may obtain the proportion of the cold data stored in the storage device and the increase that is within the target time period and that is of the cold data stored in the storage device; and determine whether the cold data stored in the storage device reaches the specified first proportion threshold and whether the increase within the target time period reaches the specified first increase threshold. If the cold data stored in the storage device has reached the specified first proportion threshold, and the increase within the preset duration has reached the specified first increase threshold, it indicates that the data stored in the storage device is relatively cold, and temperature of the stored data tends to become colder. In this case, it is determined that colder data needs to be stored currently, and the following step 702 is performed to convert the PMR zone to the SMR zone. The target time period may be a recent time period. For example, duration of the target time period may be preset duration, and an ending time point of the target time period may be a current time point.

Condition (5): whether hot data stored in the storage device reaches a specified second proportion threshold.

If the preset condition is the condition (5), the processor may obtain a proportion of the hot data stored in the storage device, and determine whether the hot data stored in the storage device reaches the specified second proportion threshold. If the hot data reaches the specified second proportion threshold, the processor performs the following step 702. The hot data is also referred to as hotspot data, and the hot data is data whose access frequency is higher than a temperature threshold. In a possible implementation, the processor may obtain a data volume of hot data stored in each zone and a data volume of all data stored in the zone, obtain a proportion of the data volume of the hot data in the data volume of all the data, use the proportion as a proportion of hot data stored in the storage device, and compare the proportion of the hot data with the specified first proportion threshold, so as to determine whether the hot data reaches the specified first proportion threshold.

In some possible embodiments, if step 701 is performed based on the condition (5), the first zone may be an SMR zone, and the second zone may be a PMR zone. In a scenario in which temperature of the data increases, the processor may determine, based on the condition (5), whether the hot data in the storage device reaches the specified second proportion threshold. If the hot data reaches the specified second proportion threshold, the processor converts the SMR zone into the PMR zone, to obtain more PMR zones. In this way, an IOPS requirement is relatively high for the storage device thanks to the relatively large proportion of the hot data stored in the storage device. Therefore, an SMR zone of the storage device is converted into a PMR zone. Because IOPS in the PMR format is higher than IOPS in the SMR format, the IOPS of the storage device can be increased, thereby improving performance of the storage device.

The second proportion threshold may be set based on an experiment, experience, or a requirement. A specific value of the second proportion threshold is not limited in this embodiment. In some possible embodiments, the second proportion threshold may be prestored in the storage device, for example, stored in a memory of the storage device. The processor may read the second proportion threshold from the memory. In some other possible embodiments, the user may enter the second proportion threshold on the terminal, the terminal may obtain the second proportion threshold entered by the user, the terminal may send the second proportion threshold to the storage device, and the storage device may receive the second proportion threshold from the terminal.

Optionally, the second proportion threshold may be dynamically adjusted. Specifically, the terminal may send a second proportion threshold to the storage device for a plurality of times. Each time the storage device receives a second proportion threshold from the terminal, the storage device may update a stored second proportion threshold to the received second proportion threshold.

In some possible embodiments, the condition (5) may include: whether the hot data stored in the storage device reaches the specified second proportion threshold, and whether an increase that is within the target time period and that is of the hot data stored in the storage device reaches a specified second increase threshold. In this case, the system controller may obtain the proportion of the hot data stored in the storage device and the increase that is within the target time period and that is of the hot data stored in the storage device; and determine whether the hot data stored in the storage device reaches the specified second proportion threshold and whether the increase within the target time period reaches the specified second increase threshold. If the hot data stored in the storage device has reached the specified second proportion threshold, and the increase within the preset duration has reached the specified second increase threshold, it indicates that the data stored in the storage device is relatively hot, and temperature of the stored data tends to become hotter. In this case, if it is determined that storage at higher IOPS is currently required, the following step 702 is performed to convert the SMR zone to the PMR zone.

Condition (6): whether IOPS of the storage device is lower than a specified input/output operation threshold.

If the preset condition includes the condition (6), the processor may obtain the IOPS of the storage device, and determine whether the IOPS of the storage device is lower than the specified input/output operation threshold. If the IOPS is lower than the specified input/output operation threshold, the processor performs the following step 702.

In some possible embodiments, if step 701 is performed based on the condition (6), the first zone may be an SMR zone, and the second zone may be a PMR zone. In a scenario in which the IOPS of the storage device does not meet a requirement, the processor determines whether the IOPS of the storage device is lower than the specified input/output operation threshold. If the IOPS is lower than the specified input/output operation threshold, the processor converts the SMR zone into a PMR zone, to obtain more PMR zones. In this case, IOPS in the PMR format is higher than IOPS in the SMR format, so that the IOPS of the storage device can be increased, thereby improving performance of the storage device.

The input/output operation threshold may be set based on an experiment, experience, or a requirement. A specific value of the input/output operation threshold is not limited in this embodiment. In some possible embodiments, the input/output operation threshold may be prestored in the storage device, for example, stored in a memory of the storage device. The processor may read the input/output operation threshold from the memory. In some other possible embodiments, the user may enter the input/output operation threshold on the terminal, the terminal may obtain the input/output operation threshold entered by the user, the terminal may send the input/output operation threshold to the storage device, and the storage device may receive the input/output operation threshold from the terminal.

Optionally, the input/output operation threshold may be dynamically adjusted. Specifically, the terminal may send an input/output operation threshold to the storage device for a plurality of times. Each time the storage device receives an input/output operation threshold from the terminal, the storage device may update a stored input/output operation threshold to the received an input/output operation threshold.

In some possible embodiments, a combination of the foregoing conditions (1) to (6) may include two or more of the foregoing conditions (1) to (6), and there may be an "and" relationship and an "or" relationship between the conditions. For example, the condition (1) and the condition (2) are combined. The processor may determine whether the free space of the storage device is lower than the specified space threshold and whether a quantity of PMR zones is higher than the specified first quantity threshold. If the free space of the storage device is lower than the specified space threshold, and the quantity of PMR zones is higher than the specified first quantity threshold, it indicates that the current free space of the storage device is insufficient and sufficient PMR zones can be converted. In this case, the following step 702 is performed.

Step 702: If the storage device meets the preset condition, the processor selects a first zone.

For differentiated description, a zone before storage format conversion is referred to as a first zone, and a zone after storage format conversion is referred to as a second zone. The processor may select the first zone from at least two zones in the disk, to convert the selected first zone into a second zone.

Data is stored in the first zone in a first storage format, and data is stored in the second zone in a second storage format. Each of the first storage format and the second storage format is one of the SMR format or the PMR format, and the first storage format is different from the second storage format.

Specifically, in some possible embodiments, the first zone may be an SMR zone, and the second zone may be a PMR zone. Data is stored in the first zone in the SMR format, and data is stored in the second zone in the PMR format. In some other possible embodiments, the first zone may be a PMR zone, and the second zone may be an SMR zone. Data is stored in the first zone in the PMR format, and data is stored in the second zone in the SMR format.

In some possible embodiments, before selecting the first zone, the processor may obtain the free space of the storage device, and determine whether the free space is greater than or equal to space of one second zone. If the free space is greater than or equal to space of one second zone, the processor selects the first zone. For example, if the storage device is an SMR drive, a processor of the SMR drive may determine whether the SMR drive has free space and whether the free space is greater than space of one PMR zone. If the free space is greater than space of one PMR zone, the processor selects a to-be-converted SMR zone. If the storage device is a PMR drive, a processor of the PMR drive may determine whether the PMR drive has free space and whether the free space is greater than space of one SMR zone. If the free space is greater than space of one SMR zone, the processor selects a to-be-converted PMR zone.

In some possible embodiments, in a scenario of switching an SMR zone to PMR zones, because a capacity of the SMR zone is greater than a capacity of a PMR zone, generally, only a plurality of PMR zones can be converted into an SMR zone. In this case, the processor may select a plurality of consecutive SMR zones as a first zone. A quantity of selected SMR zones may be an integer multiple of a preset proportion, and the preset proportion is a ratio of a capacity of the PMR zone to a capacity of the SMR zone. For example, if one PMR zone is 60 SMR zones, the preset proportion may be 60. For example, an SMR zone 0 to an SMR zone 59 may be selected, and the 60 SMR zones may be used as a first zone. Subsequently, the 60 SMR zones may be converted into one PMR zone. For another example, an SMR zone 0 to an SMR zone 119 may be selected, and the 120 SMR zones may be used as a first zone. Subsequently, the 120 SMR zones may be converted into two PMR zones.

Step 703: The processor migrates, to another zone of the storage device, data stored in the first zone.

The processor may select, from the storage device, the another zone different from the first zone, and migrate, to the another zone, the data stored in the first zone, so as to pre-organize the data stored in the first zone to another location, thereby avoiding a loss of the data stored in the first zone and achieving an effect of backing up the data stored in the first zone. The another zone may be a free zone, and a capacity of the another zone may be greater than or equal to a capacity of the first zone.

In some possible embodiments, after migrating the data in the first zone, the processor may mark the first zone as a convertible zone. Each time a storage format conversion step is performed, a zone marked as a convertible zone may be selected to convert the convertible zone. In this case, if the processor migrates data in N first zones, the processor may mark the N first zones as convertible zones. If second zones obtained through conversion are sufficient after storage formats of M convertible zones in the N convertible zones are converted, the processor may stop performing the storage format conversion step. In this case, (N–M) convertible zones in the storage device have not been converted. When the storage device meets the preset condition next time, a first zone may be selected from the remaining (N–M) convertible zones without performing a data migration step, to convert a storage format of the first zone. N and M are positive integers, and N is greater than M.

In a possible implementation, the processor may generate convertible-zone information, and store the convertible-zone information in the memory. The convertible-zone information is used to record a convertible zone, and the convertible-zone information may include a zone identifier of each convertible zone. After migrating data in any zone, the processor may use the zone as a convertible zone, and write a zone identifier of the zone into the convertible-zone information. When the processor needs to perform storage format conversion on a convertible zone, the processor may read a zone identifier of the zone from convertible-zone information, determine the zone corresponding to the zone identifier, and use the zone as the convertible zone.

Step 704: The processor instructs the first zone to convert the first storage format into the second storage format, to obtain a second zone.

The processor may instruct the SMR zone to convert the storage format from the SMR format to the PMR format, to obtain a PMR zone. Alternatively, the processor may instruct the PMR zone to convert the storage format from the PMR format to the SMR format, to obtain an SMR zone.

In some possible embodiments, a storage format conversion function may be implemented by enabling a parameter corresponding to a new storage format and disabling a parameter corresponding to an old storage format. Specifically, the first zone may be preconfigured with a first parameter and a second parameter. The first parameter is used to support the first storage format, and the second parameter is used to support the second storage format. The processor may instruct the first zone to enable the second parameter and disable the first parameter. The parameter of the first zone is updated from the first parameter to the second parameter by enabling the second parameter and disabling the first parameter. In this case, when the first zone is subsequently used to store data, the data is stored in the first zone in the storage format supported by the second parameter, instead of being stored in the storage format supported by the first parameter. In this way, a storage format conversion function is implemented.

For example, if the first zone is an SMR zone, the second zone is a PMR zone, the first storage format is the SMR format, and the second storage format is the PMR format, the first parameter is a parameter used to support the SMR format, that is, a zone format of the SMR zone, and the second parameter is a parameter used to support the PMR format, that is, a zone format of the PMR zone. The processor instructs the SMR zone to enable the parameter supporting the PMR format and disable the parameter supporting the SMR format, so that the parameter of the SMR zone is updated to the parameter supporting the PMR format, that is, the storage format of the SMR zone is converted from the SMR format to the PMR format. In other words, the SMR zone is converted into a PMR zone. Similarly, if the first zone is a PMR zone, the second zone is an SMR zone, the first storage format is the PMR format, and the second storage format is the SMR format, the first parameter is a parameter used to support the PMR format, that is, a zone format of the PMR zone, and the second parameter is a parameter used to support the SMR format, that is, a zone format of the SMR zone. The processor instructs the PMR zone to enable the parameter supporting the SMR format and disable the parameter supporting the PMR format, so that the parameter of the PMR zone is updated to the parameter supporting the SMR format, that is, the storage format of the PMR zone is converted from the PMR format to the SMR format. In other words, the PMR zone is converted into an SMR zone.

In some possible embodiments, the first parameter may include one or more subparameters. For example, the first parameter may include any one of and a combination of a flying height, BPI, TPI, a distance between a reader and a writer in a tangent line, and a distance between the reader and the writer in a radial direction. The second parameter may also include one or more subparameters. For example, the first parameter may include any one of and a combination of a flying height, BPI, TPI, a distance between a reader and a writer in a tangent line, and a distance between the reader and the writer in a radial direction.

If the first parameter and the second parameter each include a plurality of subparameters, the memory may instruct the first zone to enable each subparameter of the second parameter and disable each subparameter of the first parameter. For example, if the first parameter is used to support the SMR format, and the second parameter is used to support the PMR format, the memory may instruct the first zone to enable the TPI and the BPI that are used to support the SMR format, and to disable the TPI and the BPI that are used to support the PMR format.

In some possible embodiments, if there are N zones on the disk of the storage device, the first parameter and the second parameter may be preconfigured for each of the N zones, and a total of 2N parameters are configured for the storage device, where N is a positive integer.

For example, the first parameter and the second parameter of each zone may be configured in a factory test phase of the storage device. For example, when an HDD is manufactured in a factory, a first parameter and a second parameter of each zone may be stored in a memory (for example, a flash memory) of the HDD. In this way, when the HDD runs, the processor may read a preconfigured first parameter or a preconfigured second parameter of a first zone from the memory.

In a related technology, each storage unit on a PMR drive is a PMR zone, and each PMR zone permanently stores data in the PMR format. Although very few (about 1%) PMR zones are retained on an SMR drive, the PMR zone is not used to store data, but is used as a buffer between different SMR zones. That is, each zone that is used to store data and that is on the SMR drive is also an SMR zone, and each SMR zone is fixedly used to store data in the SMR format. In conclusion, in the related technology, regardless of the PMR drive or the SMR drive, a storage format of each storage unit on the disk is fixed. The storage format of each storage unit is only the PMR format or only the SMR format, and no mutual conversion is performed between the two storage formats. In addition, in the related technology, the PMR drive stores only the parameter supporting the PMR format, but does not store the parameter supporting the SMR format. Therefore, the PMR zone cannot be switched to the SMR zone. However, the SMR drive stores only the parameter supporting the SMR format, but does not store the parameter supporting the PMR format. Therefore, the SMR zone cannot be switched to the PMR zone.

However, in this embodiment, two parameters are configured for a zone of the disk at the same time, that is, a parameter supporting the SMR format and a parameter supporting the PMR format are configured. One of the parameters may be enabled and the other parameter may be disabled, according to a requirement, a storage format of the zone is adaptively switched between the PMR format and the SMR format.

In some possible embodiments, there may be a plurality of converted first zones, and the storage device may sequentially convert the plurality of first zones. Specifically, the storage device may sequentially instruct the plurality of first zones to convert the first storage format to the second storage format in an arrangement order of the plurality of first zones on the storage device. Each first zone may be a ring on a disk platter of the storage device. The plurality of first zones may be distributed concentrically. The processor may sequentially instruct the plurality of first zones in an order from an outer radius to an inner radius to convert the first storage format into the second storage format, or may sequentially instruct the plurality of first zones in an order from an inner radius to an outer radius to convert the first storage format into the second storage format.

In some possible embodiments, after instructing the first zone to convert the first storage format into the second storage format, the processor may continue to determine whether the storage device meets the preset condition. If the storage device does not meet the preset condition, the processor continues to select a first zone, and converts a storage format of the selected first zone, to obtain more second zones. These steps are repeatedly performed to enable the storage device to gradually meet the preset condition. When the storage device already meets the preset condition, the storage device may stop performing a storage format conversion step. In this way, the storage device may be controlled to a state in which the preset condition is met. This expands a control function of the storage device.

For example, after the processor instructs a PMR zone to convert a storage format from the PMR format to the SMR format, if the free space of the storage device is still lower than the specified space threshold, the processor may continue to instruct another PMR zone to convert a storage format from the PMR format to the SMR format, to obtain more SMR zones, so as to continue to increase the free space of the storage device by using the more SMR zones, until the free space of the storage device reaches the specified space threshold. In this way, a size of the free space of the storage device may be controlled to approximate the space threshold.

For another example, after the processor instructs the first zone to convert the first storage format into the second storage format, if a quantity of second zones of the storage device is still lower than the specified second quantity threshold, the processor may continue to instruct another first zone to convert a storage format from a first storage format to a second storage format, to obtain more second zones, so as to continue to increase the quantity of second zones of the storage device, until the quantity of second zones of the storage device reaches the second quantity threshold. In this way, the quantity of second zones of the storage device may be controlled to approximate the second quantity threshold. For example, if the second quantity threshold is K, performing the method provided in this embodiment can control the quantity of SMR zones or the quantity of PMR zones to approximate K, where K is a positive integer.

Optionally, if the storage device performs, for a plurality of times, the steps of selecting a first zone and converting a storage format of the first zone, the storage device may migrate, to a second zone obtained through previous conversion, data stored in a first zone that is selected next time. For example, in a scenario of converting from an SMR zone to a PMR zone, after the storage device converts an SMR zone 1 into a PMR zone 1, when a storage format of an SMR zone 2 needs to be converted, data stored in the SMR zone 2 may be migrated to the PMR zone 1, and then the SMR zone 1 is converted. Certainly, the storage device may alternatively migrate, to another zone, data stored in a first zone that continues to be selected. This is not limited in this embodiment.

In some possible embodiments, after obtaining a second zone, the processor may store data in the second zone. In some possible embodiments, after receiving a write request, the processor may obtain data in the write request, and store the data in the write request into the second zone. In some other possible embodiments, the processor may migrate, to the second zone, data stored in the another zone. For example, if the second zone is an SMR zone, cold data stored in the another zone may be migrated to the second zone. If the second zone is a PMR zone, hot data stored in another zone may be migrated to the second zone. In this way, features of a higher storage capacity in the SMR format and higher IOPS in the PMR format can be fully utilized, and distribution of cold data and hot data in the disk can be adjusted, so that storage resources of the disk are properly planned, and overall performance of the disk is more optimized.

In some possible embodiments, the storage device may store a correspondence between a zone identifier and a zone type. The correspondence includes at least one zone identifier and a zone type corresponding to each zone identifier. For example, the correspondence may be shown in the following Table 1. After instructing the first zone to convert the first storage format into the second storage format, the processor may query, based on a zone identifier of the first zone, the correspondence for a zone type corresponding to the zone identifier, and update the zone type as a zone type corresponding to the second storage format. For example, if the processor instructs a zone 1 to convert a storage format from the SMR format to the PMR format, after the storage format of the zone 1 is converted, an SMR zone corresponding to the zone 1 in Table 1 may be updated as a PMR zone. The zone identifier is used to identify a corresponding zone, and may be, for example, an identification (English full name: identification, ID for short) or a number of the zone. The zone identifier may be allocated by the storage device to each zone of the disk. The zones may include two types of zones: an SMR zone and a PMR zone. A correspondence between a zone identifier and a zone type may be stored in a memory (for example, a flash memory) of the storage device. The terminal may read the correspondence from the memory of the storage device; may learn, based on the correspondence, of a specific type of each zone in the storage device, so as to learn of a current quantity of SMR zones and a current quantity of PMR zones of the storage device; and present the current quantity of SMR zones and the current quantity of PMR zones to an upper-layer application, so that the upper-layer application manages the storage device.

TABLE 1

| Zone identifier | Zone type |
| --- | --- |
| Zone 1 | SMR zone |
| Zone 2 | PMR zone |
| Zone 3 | SMR zone |

In some possible embodiments, the processor may record the quantity of SMR zones and the quantity of PMR zones in the storage device. For example, the memory of the storage device may store record information. The record information includes a quantity of SMR zones and a quantity of PMR zones. After instructing the first zone to convert a storage format, the storage device may update the record information. For example, if the storage device converts k SMR zones into m PMR zones, the quantity of SMR zones in the record information may be decreased by k, and the quantity of PMR zones in the record information may be increased by m, where k and m are positive integers.

Figure 8:
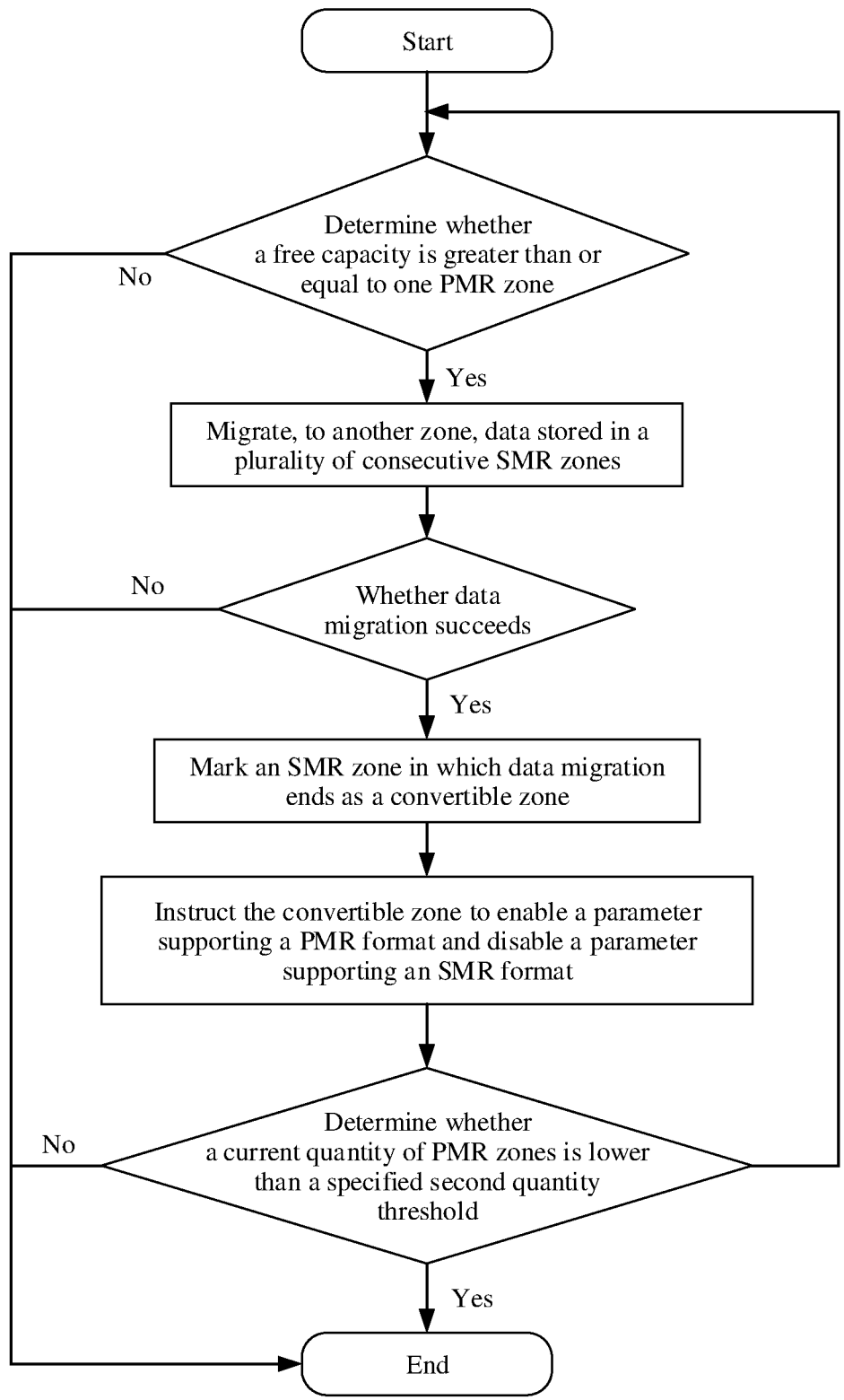
FIG. 8 is a flowchart of switching from an SMR zone to a PMR zone according to an embodiment of this application.

For example, a first zone is an SMR zone, and a second zone is a PMR zone. In some possible embodiments, refer to FIG. 8. FIG. 8 is a flowchart of switching, by an SMR drive, an SMR zone on the disk from the SMR zone to a PMR zone. The flowchart shows the following steps 1 to 6:

Step 1: Determine whether a free capacity is greater than or equal to space of one PMR zone. If yes, go to step 2; or if no, a process ends.

Step 2: Migrate, to another zone, data stored in a plurality of consecutive SMR zones.

Step 3: Determine whether the data is migrated. If yes, perform step 4; or if no, the process ends.

Step 4: Mark an SMR zone in which data migration ends as a convertible zone.

Step 5: Instruct the convertible zone to enable a parameter supporting a PMR format and disable a parameter supporting an SMR format.

Step 6: Determine whether a current quantity of PMR zones is lower than a specified second quantity threshold. If yes, continue to perform the foregoing step 2 to step 6; or if no, the process ends.

According to the method shown in FIG. 8, for an SMR drive that focuses on a capacity but has relatively insufficient IOPS, if temperature of data stored in the SMR drive increases, a frequency of random access increases. In this scenario, when storage is performed in the SMR format, IOPS is insufficient. In this case, some SMR zones may be reduced, and these SMR zones may be converted into PMR zones, to increase the IOPS, so as to meet a higher IOPS requirement when hot data is stored.

Figure 9:
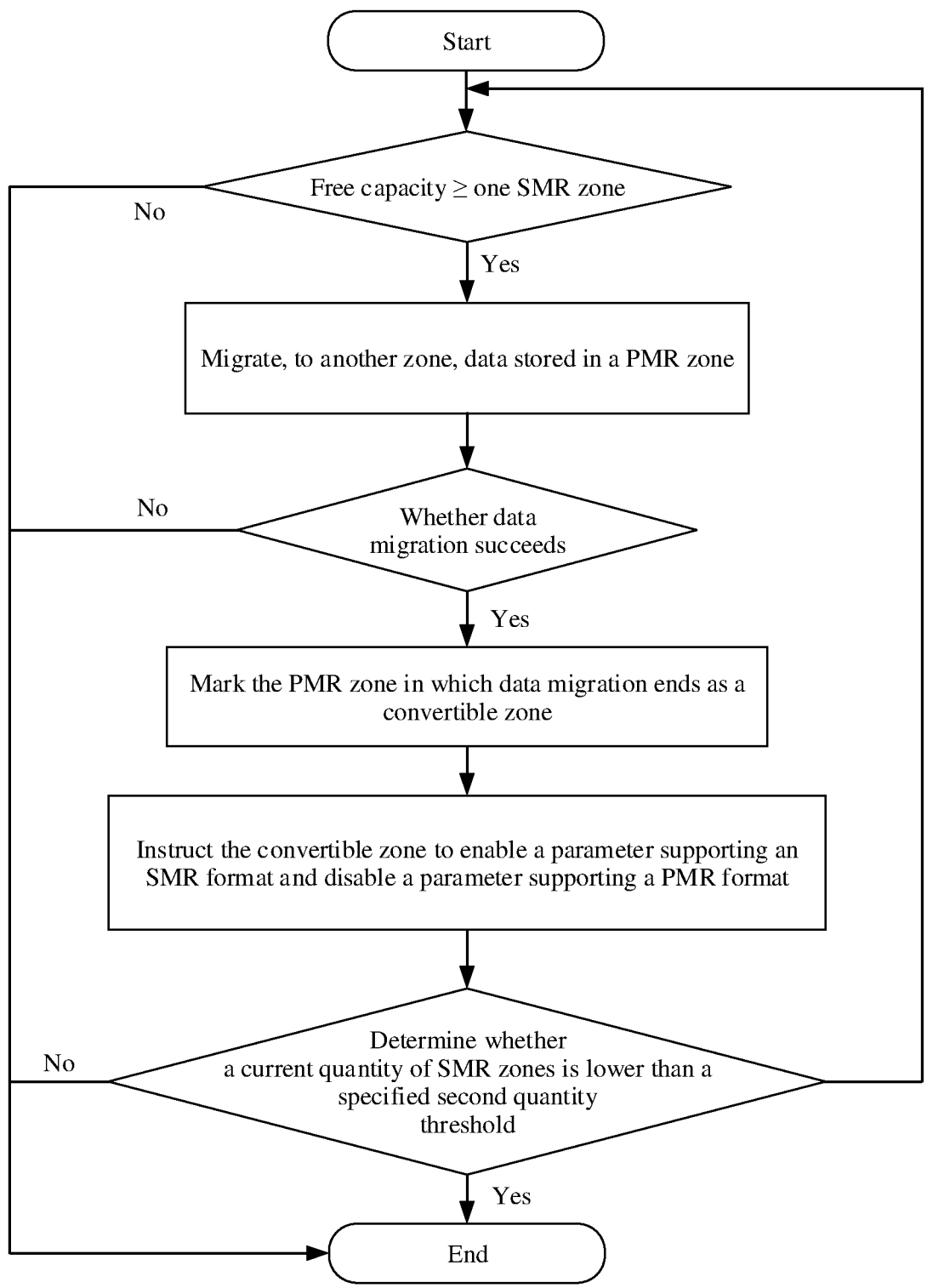
FIG. 9 is a flowchart of switching from a PMR zone to an SMR zone according to an embodiment of this application.

For example, a first zone is a PMR zone, and a second zone is an SMR zone. In some possible embodiments, refer to FIG. 9. FIG. 9 is a flowchart of switching, by a PMR drive, a PMR zone on the disk from the PMR zone to an SMR zone. The flowchart shows the following steps 1 to 6:

Step 1: Determine whether a free capacity is greater than or equal to space of one SMR zone. If yes, go to step 2; or if no, a process ends.

Step 2: Migrate, to another zone, data stored in the PMR zone.

Step 3: Determine whether the data is successfully migrated. If yes, perform step 4; or if no, the process ends.

Step 4: Mark the PMR zone in which data migration ends as a convertible zone.

Step 5: Instruct the convertible zone to enable a parameter supporting an SMR format and disable a parameter supporting a PMR format.

Step 6: Determine whether a current quantity of SMR zones is lower than a specified second quantity threshold. If yes, continue to perform the foregoing step 2 to step 6; or if no, the process ends.

According to the method shown in FIG. 9, for a PMR drive that focuses on IOPS but has a relatively insufficient storage capacity, if temperature of data stored in the PMR drive decreases, a random access frequency decreases. In this scenario, some PMR zones may be reduced, and these PMR zones are converted into SMR zones to increase a storage capacity so that more data is stored.

In an example scenario, the storage device may include a processor and a large quantity of zones. By performing the steps in the foregoing method embodiments, the processor may control one or more zones to flexibly switch between an SMR zone and a PMR zone, so as to find a tradeoff between a storage capacity and IOPS. To be specific, if a larger storage capacity is currently required, the PMR zone is converted into an SMR zone; or if IOPS needs to be increased currently, the SMR zone is converted into a PMR zone. In addition, bidirectional switching may be performed. To be specific, a zone may be controlled to switch from an SMR zone to a PMR zone or from a PMR zone to an SMR zone.

Implementing the method provided in this embodiment can further achieve at least the following effects, in addition to increasing a storage capacity or IOPS:

First, in a related technology, HDDs are classified into various specifications based on different storage capacities. For example, HDDs with a storage capacity of 1 terabyte (English full name: terabyte, TB for short) are denoted as specification 1, HDDs with a storage capacity of 1.1 TB are denoted as specification 2, and HDDs with a storage capacity of 1.2 TB are denoted as specification 3. The various specifications lead to inconvenience for HDD vendors to produce and sell the HDDs. However, according to the method provided in this embodiment, a storage capacity of an HDD may be a variable. The variable may dynamically change within a range. A minimum value of the range may be a storage capacity of the HDD when each zone in the HDD is a PMR zone, and a maximum value of the range may be the storage capacity of the HDD when each zone in the HDD is an SMR zone. A specific value of the variable may be controlled by a processor or a system controller of the HDD by converting a storage format of a zone. In this way, because the storage capacity of the HDD is no longer a fixed and single value corresponding to the specification, but a variable that can be dynamically adjusted based on a requirement, a specification model of the HDD can be reduced or even eliminated. For example, 1 TB to 1.2 TB of HDDs all are denoted as one specification without distinguishing between specification 1, specification 2, and specification 3. If the storage capacity needs to be increased, more PMR zones are controlled to be converted into SMR zones. If the storage capacity no longer needs to be increased, more SMR zones are controlled to be converted into PMR zones. In this way, flexibility of HDD vendors are greatly improved by reducing or even eliminating specifications. Further, when a new hard disk is introduced, a model of a new hard disk may be reduced, thereby reducing pressure on a hard disk manufacturer and a storage service provider.

Second, on the basis that the hard disks of all the specifications are combined into the hard disks of a unified specification, test tasks of the hard disks of all the specifications may be combined, thereby reducing overheads of the test tasks. For example, a total of three test policy originally needs to be designed for HDDs of specification 1, HDDs of specification 2, and HDDs of specification 3, respectively. In addition, the three test policies are used to test the HDDs of the three specifications, respectively. However, according to the method provided in this embodiment, the specification 1, the specification 2, and the specification 3 may be combined into one specification, one test policy is designed for the specification, and the test policy is used to test the HDDs of the specification. This can reduces test pressure on the hard disk manufacturers and the storage service providers.

Third, on the basis that the hard disks of all the specifications are combined into the hard disks of a unified specification, update tasks of the hard disks of all the specifications may be combined, thereby reducing update overheads. For example, an update task is to perform fault rectification. If a fault occurs in an HDD, a total of three fault rectification policies need to be designed for the HDDs of the specification 1, the HDDs of the specification 2, and the HDDs of the specification 3, respectively. In addition, the three fault rectification policies are used to test the HDDs of the three types, respectively. However, according to the method provided in this embodiment, the specification 1, the specification 2, and the specification 3 may be combined into one specification, one fault rectification policy is designed for the specification, and the HDDs of the specification are repaired according to the fault rectification policy. This can reduce update pressure on the hard disk manufacturers and the storage service providers.

According to the method provided in this embodiment, a storage format of an SMR zone is converted from the SMR format to the PMR format, to obtain a PMR zone. Because IOPS in the PMR format is higher than IOPS in the SMR format, after the storage format is converted, the IOPS in the zone can be increased, and overall IOPS of the storage device can be increased. Alternatively, a storage format of a PMR zone is converted from the PMR format to the SMR format, to obtain an SMR zone. Because a storage capacity in the SMR format is higher than a storage capacity in the PMR format, after the storage format is converted, the storage capacity of the zone can be increased, and a storage capacity of the storage device can be further increased.

An example in which a storage unit is a disk is used below to describe a hard disk format conversion procedure by using the embodiment in FIG. 10.

Figure 10:
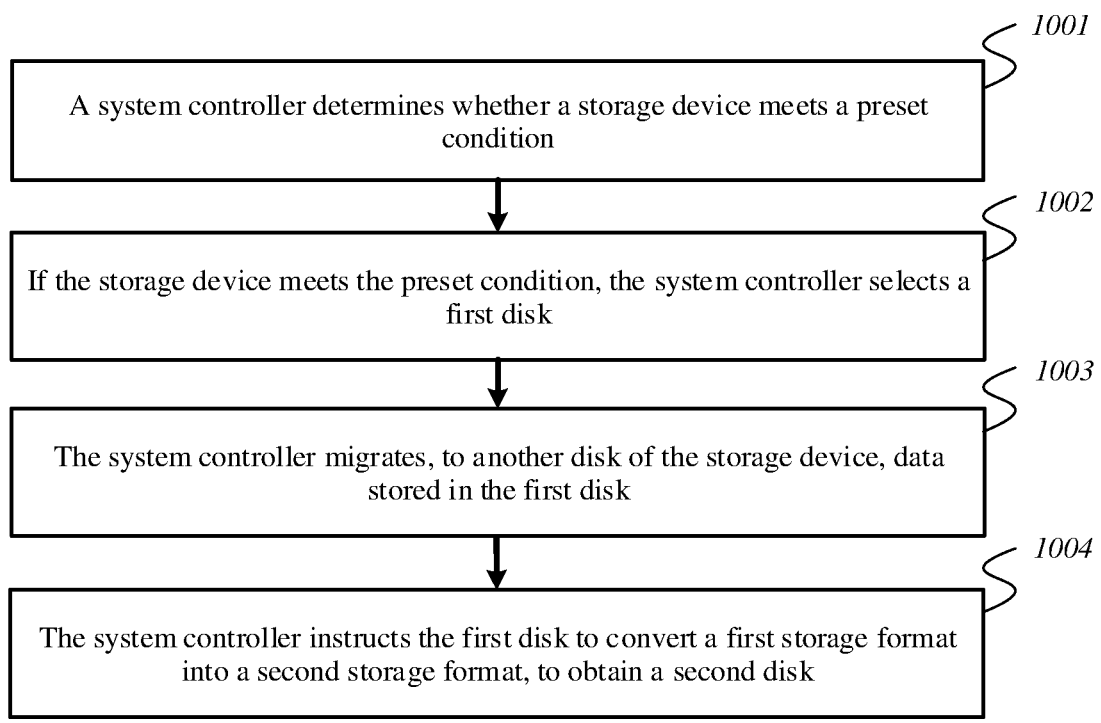
FIG. 10 is a flowchart of a hard disk format conversion method according to an embodiment of this application.

FIG. 10 is a flowchart of a hard disk format conversion method according to an embodiment of this application. As shown in FIG. 10, the method may be applied to the storage device shown in FIG. 6, for example, may be performed by the system controller 601 of the storage device 600. The method includes the following steps 1001 to 1004:

Step 1001: The system controller determines whether the storage device meets a preset condition.

In some possible embodiments, the preset condition may include any one of and a combination of the following condition (1) to condition (6):

Condition (1): whether free space of the storage device is lower than a specified space threshold.

If the preset condition includes the condition (1), the system controller may obtain the free space of the storage device, and determine whether the free space of the storage device is lower than the specified space threshold. If the free space of the storage device is lower than the specified space threshold, the system controller performs the following step 1002. The system controller may obtain free space of each disk in the storage device, and determine a sum of free space of all the disks as the free space of the storage device.

If step 1001 is performed based on the condition (1), in a scenario in which the free space of the storage device is insufficient, the system controller may convert a storage format of a PMR drive from a PMR format to an SMR format after determining that the storage device meets the condition (1), to obtain an SMR drive. In this case, a storage capacity of the SMR drive is higher than a capacity of the PMR drive. Therefore, a storage capacity of the storage device can be increased, thereby resolving insufficiency of free space.

The space threshold may be set based on an experiment, experience, or a requirement. A specific value of the space threshold is not limited in this embodiment. In some possible embodiments, the space threshold may be prestored in the system controller. For example, the space threshold may be stored in a memory of the system controller. The system controller may read the space threshold from the memory. In some other possible embodiments, a user may enter the space threshold on a terminal, the terminal may obtain the space threshold entered by the user, the terminal may send the space threshold to the system controller, and the system controller may receive the space threshold from the terminal.

Optionally, the space threshold may be dynamically adjusted. Specifically, the terminal may send a space threshold to the system controller for a plurality of times. Each time the system controller receives a space threshold from the terminal, the system controller may update a stored space threshold to the received space threshold. With reference to this manner, the condition (1), and a subsequent step, the system controller may dynamically adjust a size of the free space. For example, a space threshold originally set by the system controller is a. The system controller determines whether the free space is lower than a. When the free space is lower than a, the system controller performs a subsequent step to convert the storage format of the PMR drive from the PMR format to the SMR format until the free space reaches a. In this case, the free space of the storage device is controlled to a. Then, the terminal sends a space threshold b to the system controller. The system controller updates the space threshold to b, and determines whether the free space is lower than b. When the free space is lower than b, the system controller performs a subsequent step to convert a storage format of another PMR drive from the PMR format to the SMR format to obtain more SMR drives, until the free space reaches b. In this case, the free space is controlled to b. In this case, the system controller may dynamically adjust the free space from a to b, thereby improving flexibility. b and a are positive numbers, and b is different from a.

Condition (2): whether a quantity of first disks is higher than a specified first quantity threshold.

If the preset condition includes the condition (2), the system controller may obtain the quantity of first disks in the storage device, and determine whether the quantity of first disks in the storage device is higher than the specified first quantity threshold. If the quantity of first disks is higher than the specified first quantity threshold, the system controller performs the following step 1002.

By performing step 1001 based on the condition (2), in a scenario in which there are sufficient first disks, the system controller may obtain more second disks through conversion, to meet a storage capacity requirement or a performance requirement. Specifically, the first disk may be an SMR drive. It is determined whether SMR drives are higher than the specified first quantity threshold. If the quantity of SMR drives is higher than the specified first quantity threshold, a subsequent step is performed to convert a storage format of the SMR drive from the SMR format to the PMR format, to obtain a PMR drive. In this case, because IOPS of the PMR drive is higher than IOPS of the SMR drive, the IOPS can be increased, thereby improving performance of the storage device. In some other possible embodiments, the first disk may be a PMR drive. It is determined whether PMR drives in the storage device are higher than the specified first quantity threshold. If the quantity of PMR drives is higher than the specified first quantity threshold, a subsequent step is performed to convert a storage format of the first disk from the PMR format to the SMR format, to obtain more SMR drives. Because a storage capacity of an SMR drive is higher than a storage capacity of a PMR drive, a storage capacity of the storage device is increased.

The first quantity threshold may be set based on an experiment, experience, or a requirement. A specific value of the first quantity threshold is not limited in this embodiment. In some possible embodiments, the first quantity threshold may be prestored in the system controller, for example, stored in a memory of the system controller. The system controller may read the first quantity threshold from the memory. In some other possible embodiments, the user may enter the first quantity threshold on the terminal, the terminal may obtain the first quantity threshold entered by the user, the terminal may send the first quantity threshold to the system controller, and the system controller may receive the first quantity threshold from the terminal.

Optionally, the first quantity threshold may be dynamically adjusted. Specifically, the terminal may send a first quantity threshold to the system controller for a plurality of times. Each time the system controller receives a first quantity threshold from the terminal, the system controller may update the stored first quantity threshold to the received first quantity threshold. With reference to this manner, the condition (2), and a subsequent step, the system controller may dynamically adjust a quantity of first disks. For example, a first quantity threshold originally set by the system controller is c. The system controller determines whether the quantity of first disks is higher than c; and when the quantity of first disks is higher than c, performs a subsequent step to convert the storage format of the first disk, thereby reducing the quantity of first disks and obtaining more second disks. Then, the terminal sends a first quantity threshold d to the system controller. The system controller updates the first quantity threshold to d, and determines whether the quantity of first disks is higher than d. When the quantity of first disks is higher than d, the system controller performs a subsequent step to obtain more second disks. In this case, if d is less than c, after a storage format of a hard disk has been converted, the quantity of first disks may be further reduced, to increase the quantity of second disks.

Condition (3): whether a quantity of second disks is lower than a specified second quantity threshold.

If the preset condition includes the condition (3), the system controller may obtain the quantity of second disks in the storage device, and determine whether the quantity of second disks in the storage device is lower than the specified second quantity threshold. If the quantity of second disks is lower than the specified second quantity threshold, the system controller performs the following step 1002.

By performing step 1001 based on the condition (3), in a scenario in which there are insufficient second disks, the system controller may obtain more second disks through conversion, to meet a storage capacity requirement or a performance requirement. In some possible embodiments, the second disk may be an SMR drive. It is determined whether SMR drives in the storage device are lower than the specified second quantity threshold. If the quantity of SMR drives is lower than the specified second quantity threshold, a subsequent step is performed to convert the storage format of the PMR drive from the PMR format to the SMR format to obtain an SMR drive. In this way, the storage device may include more SMR drives, and it is ensured that the quantity of SMR drives can meet a requirement. In addition, because a storage capacity in an SMR drive is higher than that in a PMR drive, a storage capacity of the storage device can be increased. In other possible embodiments, the second disk may be a PMR drive. It is determined whether PMR drives in the storage device are lower than the specified second quantity threshold. If the quantity of PMR drives is lower than the specified second quantity threshold, a subsequent step is performed to convert a storage format of an SMR drive from the SMR format to the PMR format. In this way, the storage device may include more PMR drives, and it is ensured that the quantity of PMR drives can meet a requirement. In addition, because IOPS of the PMR drive is higher than IOPS of the SMR drive, the IOPS can be increased, thereby improving performance of the storage device.

The second quantity threshold may be the same as or different from the first quantity threshold. A value relationship between the second quantity threshold and the first quantity threshold is not limited in this embodiment. The second quantity threshold may be set based on an experiment, experience, or a requirement. A specific value of the second quantity threshold is not limited in this embodiment. In some possible embodiments, the second quantity threshold may be prestored in the system controller, for example, stored in a memory of the system controller. The system controller may read the second quantity threshold from the memory. In some other possible embodiments, the user may enter the second quantity threshold on the terminal, the terminal may obtain the second quantity threshold entered by the user, the terminal may send the second quantity threshold to the system controller, and the system controller may receive the second quantity threshold from the terminal.

Optionally, the second quantity threshold may be expressed as a product of a total quantity of disks in the storage device and a proportion threshold, the proportion threshold is a ratio of a total quantity of second disks to a total quantity of first disks, the proportion threshold may be expressed in percentages, and the proportion threshold indicates a proportion of the second disks in the storage device. For example, if the proportion threshold is denoted as x, the second quantity threshold may be expressed as a total quantity of disks*x %, where x is a positive number.

Optionally, the second quantity threshold may be dynamically adjusted. Specifically, the terminal may send a second quantity threshold to the system controller for a plurality of times. Each time the system controller receives a second quantity threshold from the terminal, the system controller may update a stored second quantity threshold to the received second quantity threshold. With reference to this manner, the condition (2), and a subsequent step, the system controller may dynamically adjust the quantity of second disks. For example, the second quantity threshold originally set by the system controller is c. The system controller determines whether the quantity of second disks is less than d. When the quantity of second disks is lower than d, the system controller performs a subsequent step to convert a storage format of the hard disk, to obtain more second disks, until the quantity of second disks reaches d. Then, the terminal sends a second quantity threshold e to the system controller. The system controller updates the second quantity threshold to e, and determines whether the quantity of second disks is lower than e. When the quantity of second disks is lower than e, the system controller performs a subsequent step to obtain more second disks, until the quantity of second disks reaches e. In this case, if d is less than e, the quantity of second disks may be adjusted to e based on d, thereby further increasing the quantity of second disks.

Condition (4): whether cold data stored in the storage device reaches a specified first proportion threshold.

If the preset condition includes the condition (4), the system controller may obtain a proportion of the cold data stored in the storage device, and determine whether the cold data stored in the storage device reaches the specified first proportion threshold. If the cold data reaches the specified first proportion threshold, the system controller performs the following step 1002. The cold data is data whose access frequency is lower than a temperature threshold, and the temperature threshold may be prestored in the system controller. In a possible implementation, the system controller may obtain a data volume of cold data stored in each disk and a data volume of all data stored in the disk, obtain a proportion of the data volume of the cold data in the data volume of all the data, use the proportion as a proportion of cold data stored in the storage device, and compare the proportion of the cold data with the specified first proportion threshold, so as to determine whether the cold data reaches the specified first proportion threshold.

In some possible embodiments, if step 1001 is performed based on the condition (4), the first disk may be a PMR drive, and the second disk may be an SMR drive. In a scenario in which the proportion of the cold data is relatively large, the system controller may determine, based on the condition (4), whether the cold data in the storage device reaches the specified first proportion threshold. If the cold data reaches the specified first proportion threshold, the system controller converts the PMR drive into an SMR drive, to obtain more SMR drives. In this way, when a proportion of the cold data stored in the storage device is relatively large, an IOPS requirement for the storage device is relatively low. Therefore, even if the PMR drive is converted into the SMR drive, performance of the storage device is not greatly affected because of a decrease in PMR drives. In addition, because a storage capacity of an SMR drive is higher than a storage capacity of a PMR drive, a storage capacity of the entire storage device can be increased.

The first proportion threshold may be set based on an experiment, experience, or a requirement. A specific value of the first proportion threshold is not limited in this embodiment. In some possible embodiments, the first proportion threshold may be prestored in the system controller, for example, stored in a memory of the system controller. The system controller may read the first proportion threshold from the memory. In some other possible embodiments, the user may enter the first proportion threshold on the terminal, the terminal may obtain the first proportion threshold entered by the user, the terminal may send the first proportion threshold to the system controller, and the system controller may receive the first proportion threshold from the terminal.

Optionally, the first proportion threshold may be dynamically adjusted. Specifically, the terminal may send a first proportion threshold to the system controller for a plurality of times. Each time the system controller receives a first proportion threshold from the terminal, the system controller may update a stored first proportion threshold to the received first proportion threshold.

In some possible embodiments, the condition (4) may include: whether the cold data stored in the storage device reaches the specified first proportion threshold, and whether an increase that is within a target time period and that is of the cold data stored in the storage device reaches a specified first increase threshold. In this case, the system controller may obtain the proportion of the cold data stored in the storage device and the increase that is within the target time period and that is of the cold data stored in the storage device; and determine whether the cold data stored in the storage device reaches the specified first proportion threshold and whether the increase within the target time period reaches the specified first increase threshold. If the cold data stored in the storage device has reached the specified first proportion threshold, and the increase within the preset duration has reached the specified first increase threshold, it indicates that the data stored in the storage device is relatively cold, and temperature of the stored data tends to become colder. In this case, colder data needs to be stored currently, and the following step 1002 is performed. Duration of the target time period may be preset duration, and an ending time point of the target time period may be a current time point.

Condition (5): whether hot data stored in the storage device reaches a specified second proportion threshold.

If the preset condition is the condition (5), the system controller may obtain a proportion of the hot data stored in the storage device, and determine whether the hot data stored in the storage device reaches the specified second proportion threshold. If the hot data reaches the specified second proportion threshold, the system controller performs the following step 1002. The hot data is also referred to as hotspot data, the hot data is data whose access frequency is lower than a temperature threshold, and the temperature threshold may be prestored in the storage device. In a possible implementation, the system controller may obtain a data volume of hot data stored in each disk and a data volume of all data stored in the disk, obtain a proportion of the data volume of the hot data in the data volume of all the data, use the proportion as a proportion of hot data stored in the storage device, and compare the proportion of the hot data with the specified first proportion threshold, so as to determine whether the hot data reaches the specified first proportion threshold.

In some possible embodiments, if step 1001 is performed based on the condition (5), the first disk may be an SMR drive, and the second disk may be a PMR drive. In a scenario in which the proportion of the hot data increases, the system controller may determine, based on the condition (5), whether the hot data in the storage device reaches the specified second proportion threshold. If the hot data reaches the specified second proportion threshold, the system controller converts the SMR drive into a PMR drive, to obtain more PMR drives. In this way, an IOPS requirement is relatively high for the storage device thanks to the relatively large proportion of the hot data stored in the storage device. Therefore, an SMR drive of the storage device is converted into a PMR drive. Because IOPS of an SMR drive is higher than IOPS of a PMR drive, the IOPS of the storage device can be increased, thereby improving performance of the storage device.

The second proportion threshold may be set based on an experiment, experience, or a requirement. A specific value of the second proportion threshold is not limited in this embodiment. In some possible embodiments, the second proportion threshold may be prestored in the system controller, for example, stored in a memory of the system controller. The system controller may read the second proportion threshold from the memory. In some other possible embodiments, the user may enter the second proportion threshold on the terminal, the terminal may obtain the second proportion threshold entered by the user, the terminal may send the second proportion threshold to the system controller, and the system controller may receive the second proportion threshold from the terminal.

Optionally, the second proportion threshold may be dynamically adjusted. Specifically, the terminal may send a second proportion threshold to the system controller for a plurality of times. Each time the system controller receives a second proportion threshold from the terminal, the system controller may update a stored second proportion threshold to the received second proportion threshold.

In some possible embodiments, the condition (05) may include: whether the hot data stored in the storage device reaches the specified second proportion threshold, and whether an increase that is within the target time period and that is of the hot data stored in the storage device reaches a specified second increase threshold. In this case, the system controller may obtain the proportion of the hot data stored in the storage device and the increase that is within the target time period and that is of the hot data stored in the storage device; and determine whether the hot data stored in the storage device reaches the specified second proportion threshold and whether the increase within the target time period reaches the specified second increase threshold. If the hot data stored in the storage device has reached the specified second proportion threshold, and the increase within the preset duration has reached the specified second increase threshold, it indicates that the data stored in the storage device is relatively hot, and the stored data tends to become hotter. Therefore, higher IOPS is required. In this case, the following step 1002 is performed.

In some possible embodiments, machine learning, that is, artificial intelligence (English full name: artificial intelligence, AI for short), may be used to determine whether the data is cold data or hot data. For example, a classification model may be invoked. The data is entered into the classification model, and a temperature label of the data is output.

There may be two values of the temperature label, where one indicates cold data, and the other indicates hot data. If the temperature label of the data indicates cold data, it may be determined that the data is cold data; or if the temperature label of the data indicates hot data, it may be determined that the data is hot data. The classification model may be obtained through training based on a plurality of pieces of sample data and a temperature label of each piece of sample data. For another example, a regression model may be invoked. The data is entered into the regression model, and temperature of the data is output. Whether the data is cold data or hot data may be determined based on the temperature of the data. The regression model is obtained through training based on a plurality of pieces of sample data and temperature of each piece of sample data. The classification model or the regression model may be prestored in the system controller. In some possible embodiments, model training may be performed based on massive sample data and a temperature label or temperature of each piece of sample data, to obtain the classification model or the regression model. The sample data may include different types, for example, may include a text, a picture, or a video. Model training may be performed on the system controller or another device, and the obtained classification model or regression model is sent to the system controller.

Through machine learning, whether the data is cold data or hot data can be accurately determined. In this case, based on whether the data is cold or hot and the condition (5) or the condition (6), a hard disk format conversion opportunity can be more timely and accurate.

Condition (6): whether IOPS of the storage device is lower than a specified input/output operation threshold.

If the preset condition includes the condition (6), the system controller may obtain the IOPS of the storage device, and determine whether the IOPS of the storage device is lower than the specified input/output operation threshold. If the IOPS is lower than the specified input/output operation threshold, the system controller performs the following step 1002.

In some possible embodiments, if step 1001 is performed based on the condition (6), the first disk may be an SMR drive, and the second disk may be a PMR drive. In a scenario in which the IOPS of the storage device does not meet a requirement, the system controller determines whether the IOPS of the storage device is lower than the specified input/output operation threshold. If the IOPS is lower than the specified input/output operation threshold, the system controller converts the SMR drive into a PMR drive, to obtain more PMR drives. In this case, IOPS of the PMR drive is higher than IOPS of the SMR drive, so that the IOPS of the storage device can be increased, thereby improving performance of the storage device.

The input/output operation threshold may be set based on an experiment, experience, or a requirement. A specific value of the input/output operation threshold is not limited in this embodiment. In some possible embodiments, the input/output operation threshold may be prestored in the system controller, for example, stored in a memory of the system controller. The system controller may read the input/output operation threshold from the memory. In some other possible embodiments, the user may enter the input/output operation threshold on the terminal, the terminal may obtain the input/output operation threshold entered by the user, the terminal may send the input/output operation threshold to the system controller, and the system controller may receive the input/output operation threshold from the terminal. Optionally, the input/output operation threshold may be dynamically adjusted. Specifically, the terminal may send an input/output operation threshold to the system controller for a plurality of times. Each time the system controller receives an input/output operation threshold from the terminal, the system controller may update a stored input/output operation threshold to the received an input/output operation threshold.

In some possible embodiments, a combination may include two or more of the foregoing conditions (1) to (6), and there may be an "and" relationship and an "or" relationship between combinations. For example, the condition (1) and the condition (2) are combined. The system controller may determine whether the free space of the storage device is lower than the specified space threshold and whether a quantity of PMR drives is higher than the specified first quantity threshold. If the free space of the storage device is lower than the specified space threshold, and the quantity of PMR drives is higher than the specified first quantity threshold, it indicates that the current free space of the storage device is insufficient and sufficient PMR drives can be converted.

In this case, the following step 1002 is performed.

Step 1002: If the storage device meets the preset condition, the system controller selects a first disk.

For differentiated description, a disk before storage format conversion is referred to as a first disk, and a disk after storage format conversion is referred to as a second disk. The system controller may select the first disk from at least two disks in the storage device, to convert the selected first disk into a second disk.

Data is stored in the first disk in a first storage format, and data is stored in the second disk in a second storage format. Each of the first storage format and the second storage format is one of an SMR format or a PMR format, and the first storage format is different from the second storage format.

Specifically, in some possible embodiments, the first disk may be an SMR drive, and data is stored in the first disk in the SMR format. The second disk may be a PMR drive, and data is stored in the second disk in the PMR format. In some other possible embodiments, the first disk may be a PMR drive, and data is stored in the second disk in the PMR format. The second disk may be an SMR drive, and data is stored in the first disk in the SMR format.

Step 1003: The system controller migrates, to another disk of the storage device, data stored in the first disk.

The system controller may select, from the storage device, the another disk different from the first disk, and migrate, to the another disk, the data stored in the first disk, so as to pre-organize the data stored in the first disk to another location, thereby avoiding a loss of the data stored in the first disk and achieving an effect of backing up the data stored in the first disk. The another disk may be one or more free disks, the free disk may be a completely free disk or a partially free disk, and a capacity of the another disk may be greater than or equal to a capacity of the first disk.

In some possible embodiments, if the system controller determines that colder data needs to be stored, for example, if the system controller determines that the storage device meets the preset condition (4), the system controller may select a PMR drive that stores cold data, migrate the cold data stored in the PMR drive, and convert the PMR drive into an SMR drive. If the system controller determines that higher IOPS is required, for example, the system controller determines that the storage device meets the preset condition (5), the system controller may select an SMR drive that stores hot data, migrate the hot data stored in the SMR drive, and convert the SMR drive into a PMR drive.

Step 1004: The system controller instructs the first disk to convert the first storage format into a second storage format, to obtain a second disk.

The system controller may instruct the SMR drive to convert the storage format from the SMR format to the PMR format, to obtain a PMR drive. Alternatively, the system controller may instruct the PMR drive to convert the storage format from the PMR format to the SMR format, to obtain the SMR drive.

In some possible embodiments, the system controller may instruct the SMR drive to convert a storage format of each SMR zone from the SMR format to the PMR format, so that each SMR zone of the SMR drive becomes a PMR zone, so as to obtain a PMR drive through conversion. Certainly, the system controller may also instruct the SMR drive to convert some SMR zones into PMR zones, but remaining SMR zones may be maintained as SMR zones. In this case, an SMR drive that includes both the SMR zones and the PMR zones is obtained. Similarly, the system controller may instruct the PMR drive to convert a storage format of each PMR zone from the PMR format to the SMR format. In this case, each PMR zone of the PMR drive becomes an SMR zone, so as to obtain an SMR drive through conversion. The system controller may also instruct the PMR drive to convert some PMR zones into SMR zones, but remaining PMR zones may be maintained as PMR zones. In this case, a PMR drive that includes both the SMR zones and the PMR zone is obtained.

In some possible embodiments, a storage format conversion function may be implemented by enabling a parameter corresponding to a new storage format and disabling a parameter corresponding to an old storage format. Specifically, the first disk may be preconfigured with a first parameter and a second parameter. The first parameter is used to support the first storage format, and the second parameter is used to support the second storage format. The system controller may instruct the first disk to enable the second parameter and disable the first parameter. The parameter of the first disk is updated from the first parameter to the second parameter by enabling the second parameter and disabling the first parameter. In this case, when the first disk is subsequently used to store data, the data is stored in the first disk in the storage format supported by the second parameter, instead of being stored in the storage format supported by the first parameter. In this way, a storage format conversion function.

For example, if the first disk is an SMR drive, the second disk is a PMR drive, the first storage format is an SMR format, and the second storage format is a PMR format, the first parameter is a parameter used to support the SMR format, that is, a zone format of the SMR drive, and the second parameter is a parameter used to support the PMR format, that is, a zone format of the PMR drive. The system controller instructs the SMR drive to enable the parameter supporting the PMR format and disable the parameter supporting the SMR format, thereby converting the SMR drive to a PMR drive. Similarly, if the first disk is a PMR drive, the second disk is an SMR drive, the first storage format is a PMR format, and the second storage format is an SMR format, the first parameter is a parameter used to support the PMR format, that is, a zone format of the PMR drive, and the second parameter is a parameter used to support the SMR format, that is, a zone format of the SMR drive. The system controller instructs the PMR drive to enable the parameter supporting the SMR format and disable the parameter supporting the PMR format, thereby converting the PMR drive into an SMR drive.

In some possible embodiments, after instructing the first disk to convert the first storage format into the second storage format, the system controller may continue to determine whether the storage device meets the preset condition. If the storage device does not meet the preset condition, the system controller continues to select a first disk, and converts a storage format of the selected first disk, to obtain more second disks. These steps are repeatedly performed to enable the storage device to gradually meet the preset condition. When the storage device already meets the preset condition, the system controller may stop performing a storage format conversion step. In this way, the storage device may be controlled to a state in which the preset condition is met. This expands a control function of the storage device.

For example, after the system controller instructs a PMR drive to convert a storage format from the PMR format to the SMR format, if the free space of the storage device is still lower than the specified space threshold, the system controller may continue to instruct another PMR drive to convert a storage format from the PMR format to the SMR format, to obtain more SMR drives, so as to continue to increase the free space of the storage device by using the more SMR drives, until the free space of the storage device reaches the specified space threshold. In this way, a size of the free space of the storage device may be controlled to approximate the space threshold.

For another example, after the system controller instructs the first disk to convert the first storage format into the second storage format, if a quantity of second disks of the storage device is still lower than the specified second quantity threshold, the system controller may continue to instruct another first disk to convert a storage format from a first storage format to a second storage format, to obtain more second disks, so as to continue to increase the quantity of second disks of the storage device, until the quantity of second disks of the storage device reaches the second quantity threshold. In this way, the quantity of second disks of the storage device may be controlled to approximate the second quantity threshold. For example, if the second quantity threshold is K, performing the method provided in this embodiment can control the quantity of SMR drives or the quantity of PMR drives to approximate K, where K is a positive integer.

Optionally, if the storage device performs, for a plurality of times, the steps of selecting a first disk and converting a storage format of the first disk, the storage device may migrate, to a second disk obtained through previous conversion, data stored in a first disk that is selected next time. For example, in a scenario of converting from an SMR drive to a PMR drive, after the storage device converts an SMR drive 1 into a PMR drive 1, when a storage format of an SMR drive 2 needs to be converted, data stored in the SMR drive 2 may be migrated to the PMR drive 1, and then the SMR drive 1 is converted. Certainly, the storage device may alternatively migrate, to another zone, data stored in a first disk that continues to be selected. This is not limited in this embodiment.

In some possible embodiments, after obtaining a second disk, the system controller may store data in the second disk. In some possible embodiments, after receiving a write request, a processor may obtain data in the write request, and store the data in the write request into the second disk. In some other possible embodiments, the processor may migrate, to the second disk, data stored in another disk. For example, if the second disk is an SMR drive, cold data stored in the another disk may be migrated to the second disk. If the second disk is a PMR drive, hot data stored in another disk may be migrated to the second disk. In this way, features of a higher storage capacity in the SMR format and higher IOPS in the PMR format can be fully utilized, and distribution of cold data and hot data in the storage device can be adjusted, so that overall storage resources of the storage device are properly planned, and overall performance of the disk is more optimized.

In some possible embodiments, the storage device may store a correspondence between a disk identifier and a disk type. The correspondence includes at least one disk identifier and a disk type corresponding to each disk identifier. For example, the correspondence may be shown in the following Table 2. After instructing the first disk to convert the first storage format into the second storage format, the system controller may query, based on a disk identifier of the first disk, the correspondence for a disk type corresponding to the disk identifier, and update the disk type as a disk type corresponding to the second storage format. For example, if the system controller instructs a disk 1 to convert a storage format from the SMR format to the PMR format, after the storage format of the disk 1 is converted, an SMR drive corresponding to the disk 1 in Table 2 may be updated as a PMR drive. The disk identifier is used to identify a corresponding disk, and may be, for example, an ID or a number of the disk. The disk identifier may be allocated by the system controller to each disk. The disks may include two types of disks: an SMR drive and a PMR drive. A correspondence between a disk identifier and a disk type may be stored in a memory of the system controller. The terminal may read the correspondence from the memory of the system controller; may learn, based on the correspondence, of a specific type of each disk in the storage device, and may further determine a current quantity of SMR drives and a current quantity of PMR drives of the storage device based on the type of each disk; and present the current quantity of SMR drives and the current quantity of PMR drives to an upper-layer application, so that the upper-layer application manages the storage device.

TABLE 2

| Disk identifier | Disk type |
| --- | --- |
| Disk 1 | SMR drive |
| Disk 2 | PMR drive |
| Disk 3 | SMR drive |

In some possible embodiments, the system controller may record the quantity of SMR drives and the quantity of PMR drives in the storage device. For example, record information may be stored in upper-layer application software. The record information includes a quantity of SMR drives and a quantity of PMR drives. After instructing the first disk to convert a storage format, the storage device may update the record information based on the current quantity of SMR drives and the current quantity of PMR drives. For example, if the storage device converts k SMR drives into m PMR drives, the quantity of SMR drives in the record information may be decreased by k, and the quantity of PMR drives in the record information may be increased by m, where k and m are positive integers.

Figure 11:
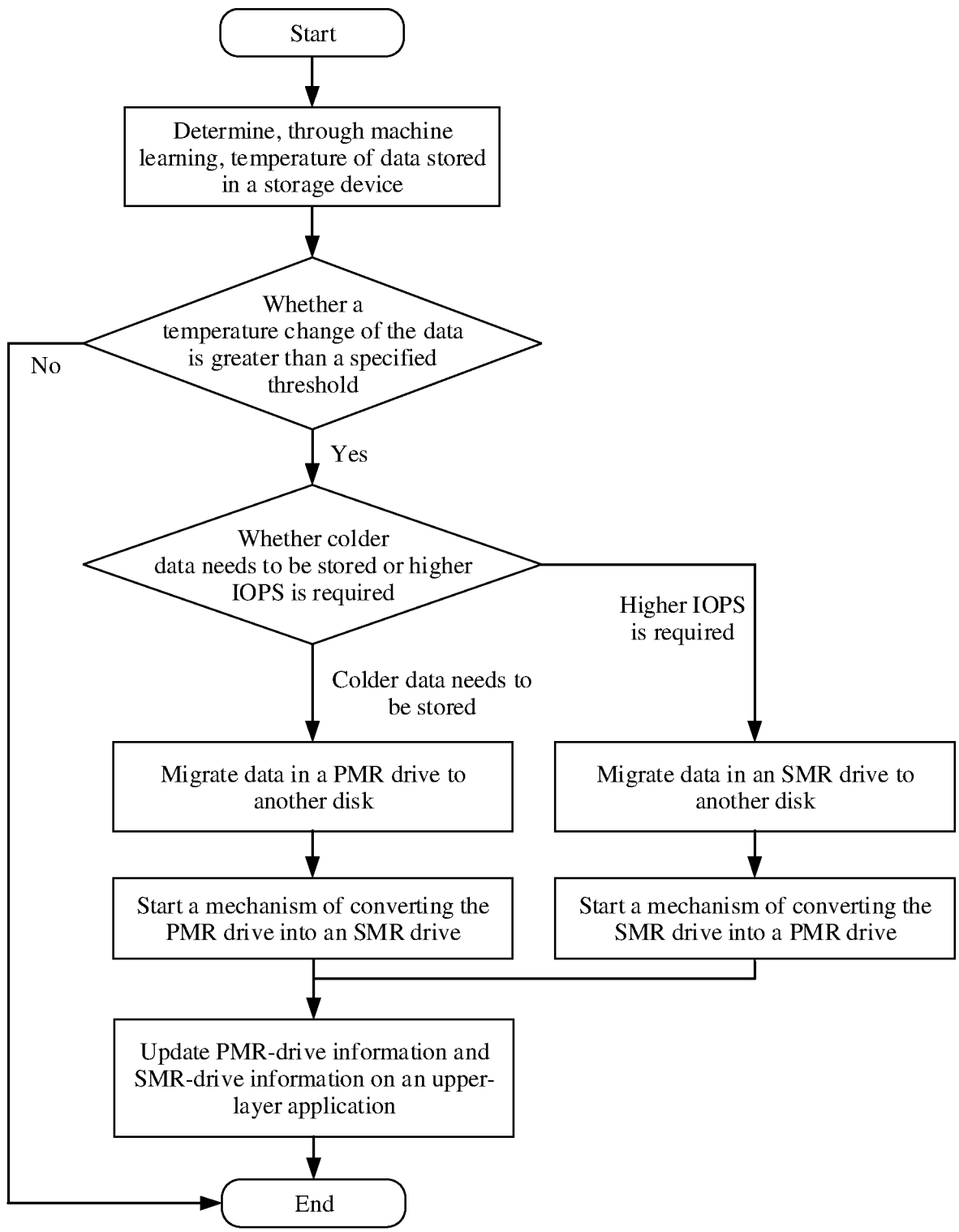
FIG. 11 is a flowchart of a hard disk format conversion method according to an embodiment of this application.

In some possible embodiments, refer to FIG. 11. FIG. 11 is a flowchart of switching a storage device between an SMR drive and a PMR drive. The flowchart shows the following steps 1 to 6.

Step 1: Determine, through machine learning, temperature of data stored in a storage device.

Step 2: Determine whether a temperature change of the data is greater than a specified threshold; and if yes, perform step 3; or if no, a process ends.

Step 3: Determine whether colder data needs to be stored or higher IOPS is required. If it is determined that colder data needs to be stored, the following step 4 is performed; or if it is determined that higher IOPS is required, the following step 6 is performed.

Step 4: Migrate data from a PMR drive to another disk.

Step 5: Start a mechanism of converting the PMR drive into an SMR drive.

Step 6: Migrate data from an SMR drive to another disk.

Step 7: Start a mechanism of converting the SMR drive into a PMR drive.

Step 8: Update information about the PMR drive and information about the SMR drive on an upper-layer application.

According to the method shown in FIG. 11, for a storage device that includes both an SMR drive and a PMR drive, temperature of data changes accordingly in different application scenarios and at different time points. If a larger amount of data becomes cold, some PMR drives may be converted into SMR drives based on the foregoing method. If a larger amount of data becomes hot, some SMR drives are converted into PMR drives in an allowable capacity proportion.

In an example scenario, the storage device may be configured to provide massive data storage services, and the storage device may include a storage controller and massive disks. By performing the steps in the foregoing method embodiments, the system controller may control one or more disks to flexibly switch between an SMR drive and a PMR drive, so as to find a tradeoff between a storage capacity and IOPS. To be specific, if a larger storage capacity is currently required, a disk is converted to an SMR drive; and if IOPS needs to be increased, the disk is converted to a PMR drive. In addition, bidirectional switching may be performed. To be specific, the disk may be controlled to switch from an SMR drive to a PMR drive or from a PMR drive to an SMR drive. In addition, the disk can also be controlled to be switched from a pure SMR drive or a pure PMR drive to a hybrid drive. The pure disk herein is a disk in a single storage format, and the storage format is either an SMR format or a PMR format. The hybrid drive herein is a disk including two storage formats. A storage format of the hybrid drive includes the SMR format and the PMR format.

According to the method provided in this embodiment, a storage format of an SMR drive is converted from the SMR format to the PMR format to obtain a PMR drive. Because IOPS of the PMR drive is higher than IOPS of the SMR drive, after the storage format is converted, the IOPS of a disk can be increased, and overall IOPS of the storage device can be increased.

Alternatively, a storage format of a PMR drive is converted from the PMR format to the SMR format to obtain an SMR drive. Because a storage capacity of an SMR drive is higher than a storage capacity of a PMR drive, a storage capacity of a disk can be increased after the storage format is converted. In addition, an overall storage capacity of the storage device can be increased.

All the foregoing optional technical solutions may be randomly combined to form optional embodiments of this application. Details are not described herein again.

Figure 12:
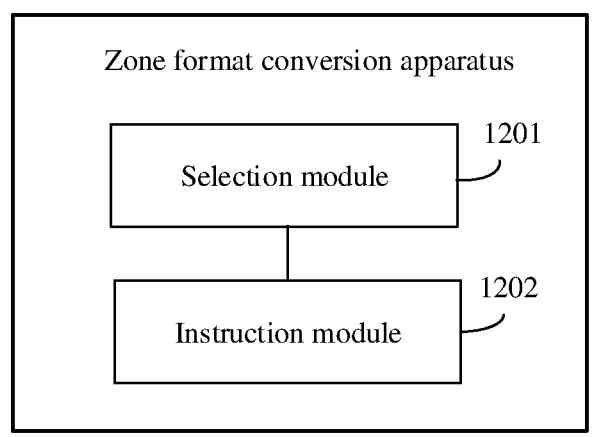
FIG. 12 is a schematic structural diagram of a hard disk format conversion apparatus according to an embodiment of this application.

FIG. 12 is a schematic structural diagram of a hard disk format conversion apparatus according to an embodiment of this application. As shown in FIG. 12, the apparatus includes: a selection module 1201, configured to select a first storage unit, for example, perform step 702 or step 1002; and an instruction module 1202, configured to instruct the first storage unit to convert a first storage format into a second storage format to obtain a second storage unit, for example, perform step 704 or step 1004.

In a possible implementation, the apparatus further includes: a determining module, configured to perform step 701 or step 1001.

In a possible implementation, the preset condition includes any one of and a combination of the preset condition (1) to the preset condition (6) in step 702 or step 1002.

In a possible implementation, the instruction module 1202 is specifically configured to instruct the first storage unit to enable the second parameter and disable the first parameter.

In a possible implementation, the apparatus further includes: a migration module, configured to migrate, to another storage unit, data stored in the first storage unit, for example, perform step 703 or step 1003.

It should be noted that the hard disk format conversion apparatus may be located in a storage device, and each step in the embodiment in FIG. 12 may be performed by a processor of the storage device by invoking an instruction stored in a memory of the storage device. In addition, the hard disk format conversion apparatus may also be located in a disk, and each step in the embodiment in FIG. 12 may be performed by a processing chip of the disk. In addition, the hard disk format conversion apparatus may be located in a system controller of a disk array. Each step in the embodiment in FIG. 12 may be performed by a processor of the system controller by invoking an instruction stored in a memory of the system controller.

It should be noted that division into the foregoing functional modules is only described as an example when the hard disk format conversion apparatus provided in the embodiment in FIG. 12 performs hard disk conversion. In actual application, the foregoing functions may be allocated, based on requirements, to be implemented by different functional modules, to be specific, an internal structure of the storage device is divided into the different functional modules to implement all or some of the functions described above. In addition, the hard disk format conversion apparatus in the foregoing embodiment and the hard disk format conversion method embodiment belong to a same concept. For a specific implementation process of the hard disk format conversion apparatus, refer to the method embodiment. Details are not described herein again.

This application further provides a computer program. The computer program includes instructions used to perform the foregoing hard disk format conversion method. For example, the computer program may include instructions used to perform the hard disk format conversion method performed by the processor in the embodiment in FIG. 7. For another example, the computer program may include instructions used to perform the hard disk format conversion method performed by the system controller in the embodiment in FIG. 10.

This application further provides a computer-readable storage medium, configured to store a computer program. The computer program includes instructions used to perform the foregoing hard disk format conversion method.

All or some of the foregoing embodiments may be implemented by using software, hardware, firmware, or any combination thereof. When software is used to implement the embodiments, all or some of the embodiments may be implemented in a form of a computer program product. The computer program product includes one or more computer program instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer program instructions may be transmitted from a website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD) or a semiconductor medium (for example, a solid-state drive)), or the like.

The term "and/or" in this application describes only an association relationship for describing associated objects and represents that three relationships may exist. For example, A and/or B may represent the following three cases: Only A exists, both A and B exist, and only B exists. In addition, the character "/" in this application generally indicates an "or" relationship between the associated objects.

In this application, the term "a plurality of" means two or more. For example, a plurality of data packets means two or more data packets.

A person of ordinary skill in the art may understand that all or some of the steps of the foregoing embodiments may be implemented by hardware or a program instructing related hardware. The program may be stored in a computer-readable storage medium. The storage medium may include a read-only memory, a magnetic disk, or an optical disc.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. A hard disk format conversion method, wherein the method is applied to a storage device, and the method comprises:
   determining a temperature condition of data stored in the storage device; and
   instructing, based on the determined temperature condition, a storage unit in the storage device to disable a first parameter associated with the storage unit and enable a second parameter associated with the storage unit thereby causing the storage unit to be converted from a first storage format into a second storage format, wherein
   the first storage format is one of a shingled magnetic recording (SMR) format and a perpendicular magnetic recording (PMR) format, and the second storage format is the other of the SMR format and the PMR format, the first parameter is configured to support the first storage format, and the second parameter is configured to support the second storage format.

2. The method according to claim 1, wherein the first parameter and the second parameter are preconfigured in the storage device; the first parameter comprises any one of or a combination of a flying height, a distance between a reader and a writer in a tangent line, and a distance between the reader and the writer in a radial direction.

3. The method according to claim 1, wherein prior to the instructing the storage unit to disable the first parameter and enable the second parameter, the method further comprises:
migrating, to another storage unit of the storage device, data stored in the storage unit.

4. The method according to claim 1, wherein the determining the temperature condition of data stored in the storage device comprises:
determining cold data stored in the storage device reaches a specified first proportion threshold, wherein the cold data is data whose access frequency is lower than a temperature threshold;
wherein the first storage format is the PMR format and the second storage format is the SMR format.

5. The method according to claim 1, wherein the determining the temperature condition of data stored in the storage device comprises:
determining hot data stored in the storage device reaches a specified second proportion threshold, wherein the hot data is data whose access frequency is higher than a temperature threshold;
wherein the first storage format is the SMR format and the second storage format is the PMR format.

6. The method according to claim 1, wherein the determining the temperature condition of data stored in the storage device comprises:
determining, through machine learning, a temperature condition of data stored in the storage device, wherein the machine learning comprises a model obtained through training based on sample data and a temperature label of each piece of the sample data.

7. The method according to claim 1, wherein the storage unit has data stored therein.

8. A hard disk format conversion apparatus, wherein the apparatus is applied to a storage device, and the apparatus comprises at least one processor configured to:
determine a temperature condition of data stored in the storage device; and
instruct, based on the determined temperature condition, a storage unit in the storage device to disable a first parameter associated with the storage unit and enable a second parameter associated with the storage unit thereby causing the storage unit to be converted from a first storage format into a second storage format, wherein
the first storage format is one of a shingled magnetic recording (SMR) format and a perpendicular magnetic recording (PMR) format and the second storage format is the other of the SMR format and the PMR format the first parameter is configured to support the first storage format, and the second parameter is configured to support the second storage format.

9. The apparatus according to claim 8, wherein the first parameter and the second parameter are preconfigured in the storage device; the first parameter comprises any one of or a combination of a flying height, a distance between a reader and a writer in a tangent line, and a distance between the reader and the writer in a radial direction.

10. The apparatus according to claim 8, wherein the at least one processor is further configured to migrate, to another storage unit of the storage device, data stored in the storage unit.

11. The apparatus according to claim 8, wherein the at least one processor is configured to determine cold data stored in the storage device reaches a specified first proportion threshold, wherein the cold data is data whose access frequency is lower than a temperature threshold;
and wherein the first storage format is the PMR format and the second storage format is the SMR format.

12. The apparatus according to claim 8, wherein the at least one processor is configured to determine hot data stored in the storage device reaches a specified second proportion threshold, wherein the hot data is data whose access frequency is higher than a temperature threshold;
and wherein the first storage format is the SMR format and the second storage format is the PMR format.

13. The apparatus according to claim 8, wherein the at least one processor is configured to determine, through machine learning, a temperature condition of data stored in the storage device, wherein the machine learning comprises a model obtained through training based on sample data and a temperature label of each piece of the sample data.

14. The apparatus according to claim 8, wherein the storage unit has data stored therein.

15. A storage device comprising a processor and at least two zones, wherein the at least two zones comprise a shingled magnetic recording (SMR) zone and a perpendicular magnetic recording (PMR) zone; and
wherein the processor is configured to:
determine a temperature condition of data stored in the storage device; and
instruct, based on the determined temperature condition, a zone in the storage device to disable a first parameter associated with the zone and enable a second parameter associated with the zone thereby causing the zone to be converted from a first storage format into a second storage format, wherein
the first storage format is one of a shingled magnetic recording (SMR) format and a perpendicular magnetic recording (PMR) format, and the second storage format is the other of the SMR format and the PMR format the first parameter is configured to support the first storage format, and the second parameter is configured to support the second storage format.

16. The storage device according to claim 15, wherein the first parameter and the second parameter are preconfigured in the storage device; the first parameter comprises any one of or a combination of a flying height, a distance between a reader and a writer in a tangent line, and a distance between the reader and the writer in a radial direction.

17. The storage device according to claim 15, wherein the processor is further configured to migrate, to another zone of the storage device, the data stored in the zone.

18. The storage device according to claim 15, wherein the processor is configured to determine cold data stored in the storage device reaches a specified first proportion threshold, wherein the cold data is data whose access frequency is lower than a temperature threshold; and
wherein the first storage format is the PMR format and the second storage format is the SMR format.

19. The storage device according to claim 15, wherein the processor is configured to determine hot data stored in the storage device reaches a specified second proportion threshold, wherein the hot data is data whose access frequency is higher than a temperature threshold; and wherein the first storage format is the SMR format and the second storage format is the PMR format.

20. The storage device according to claim 15, wherein the storage unit has data stored therein.

\* \* \* \* \*